US012722043B2

(12) United States Patent
Li

(10) Patent No.: US 12,722,043 B2
(45) Date of Patent: Sep. 1, 2026

(54) SYSTEMS AND METHODS FOR CAPTURING AND VISUALIZING THE SPINNING OF SMALL BALLS IN SPORTS

(71) Applicant: Adeia Guides Inc., San Jose, CA (US)

(72) Inventor: Zhiyun Li, Kenmore, WA (US)

(73) Assignee: Adeia Guides Inc., San Jose, CA (US)

( * ) Notice: Subject to any disclaimer, the term of this patent is extended or adjusted under 35 U.S.C. 154(b) by 166 days.

(21) Appl. No.: 18/214,787

(22) Filed: Jun. 27, 2023

(65) Prior Publication Data

US 2025/0001255 A1 Jan. 2, 2025

(51) Int. Cl.
*A63B 24/00* (2006.01)
*G01S 17/89* (2020.01)
(Continued)

(52) U.S. Cl.
CPC .......... *A63B 24/0021* (2013.01); *G01S 17/89* (2013.01); *G06T 7/246* (2017.01);
(Continued)

(58) Field of Classification Search
CPC . G06T 2207/30224; G06T 2207/10016; G06T 13/00; G06T 11/001; G06T 7/73;
(Continued)

(56) References Cited

U.S. PATENT DOCUMENTS 9,719,801 B1 * 8/2017 Ferguson ........... G01C 21/3602
2012/0181454 A1 * 7/2012 Kubota ................ B23K 26/355
250/492.1

(Continued)

FOREIGN PATENT DOCUMENTS

CN 106780620 B 1/2020
CN 112702481 A 4/2021

(Continued)

OTHER PUBLICATIONS

Aminfar, AmirHessam, et al. "Application of optical flow algorithms to laser speckle imaging." Microvascular research 122 (2019): 52-59. (Year: 2019).*

(Continued)

*Primary Examiner* — Kee M Tung
*Assistant Examiner* — Nauman U Ahmad
(74) *Attorney, Agent, or Firm* — HG LAW LLP

(57) ABSTRACT

Systems and methods are provided herein for detecting and measuring characteristics of a ball during a sporting event, and further for presenting the detected characteristics. For example, the disclosed system uses a camera to detect the location of an object (e.g., a ball used in a sporting event) and, based on the determined location, emits a laser beam at the object. The emitted laser beam scatters off the object and creates a speckle pattern detectable in the same direction as the emitted laser beam. The speckle pattern is detected, for example, using a photodetector. The photodetector captures the speckle pattern caused by the emitted laser beam interacting with the object's surface. The system analyzes the detected speckle pattern over time to determine characteristics of the object. The system may optionally display the characteristics of the object using one or more visualizations.

16 Claims, 11 Drawing Sheets

(51) Int. Cl.
*G06T 7/246* (2017.01)
*G06T 7/73* (2017.01)
*G06T 11/10* (2026.01)
*G06T 13/00* (2011.01)
*A63B 71/06* (2006.01)

(52) U.S. Cl.
CPC ................ *G06T 7/73* (2017.01); *G06T 11/10* (2026.01); *G06T 13/00* (2013.01); *A63B 2024/0028* (2013.01); *A63B 71/0622* (2013.01); *A63B 2071/0666* (2013.01); *A63B 2220/05* (2013.01); *A63B 2220/35* (2013.01); *A63B 2220/805* (2013.01); *A63B 2220/806* (2013.01); *G06T 2207/10016* (2013.01); *G06T 2207/30224* (2013.01)

(58) Field of Classification Search
CPC .............. G06T 7/246; A63B 2220/806; A63B 2220/805; A63B 2220/35; A63B 2220/05; A63B 2071/0666; A63B 2024/0028; A63B 71/0622; A63B 24/0021; G01S 17/89
See application file for complete search history.

(56) References Cited

U.S. PATENT DOCUMENTS

| | | | | |
|---|---|---|---|---|
| 2015/0338518 | A1* | 11/2015 | Sebastian | G01S 17/875 356/4.01 |
| 2021/0069569 | A1* | 3/2021 | Oh | G01S 13/88 |
| 2022/0113530 | A1* | 4/2022 | Hirose | G02B 21/362 |

FOREIGN PATENT DOCUMENTS

| | | | |
|---|---|---|---|
| CN | 114387354 | A | 4/2022 |
| EP | 0435910 | B1 * | 7/1991 |

OTHER PUBLICATIONS

"GCQuad by Foresight Sports—First Look! Unboxing, Setup, & Review." YouTube, Golf Simulator Videos, Jul. 1, 2020, www.youtube.com/watch?v=17cK65gFsi4. (Year: 2020).*

Castellini, Paolo, and Enrico Primo Tomasini. "Image-based tracking laser Doppler vibrometer." Review of scientific instruments 75.1 (2004): 222-232. (Year: 2004).*

Song Qiu, You Ding, Tong Liu, Zhengliang Liu, and Yuan Ren, "Rotational object detection at noncoaxial light incidence based on the rotational Doppler effect," Opt. Express 30, 20441-20450 (2022) (Year: 2022).*

"Dynamic Vision System," [retrieved from URL: http://ishikawa-vision.org/mvf/SaccadeMirrorFullHD/index-e.html], 2 pages (2023).

"Kalmar filter," Wikipedia, [retrieved from URL: https://en.wikipedia.org/wiki/Kalman_filter], 40 pages (2023).

"Magnus Effect,", Wikipedia, [retrieved from URL: https://en.wikipedia.org/wiki/Magnus_effect], 8 pages (2023).

"Optical Mouse Sensors," Avago Technologies, 24 pages (2007).

"Particle filter," Wikipedia, [retrieved from URL: https://en.wikipedia.org/wiki/Particle_filter], 17 pages (2023).

"Sony IMX420 Mono Scientific grade camera," [retrieved from URL: https://www.ximea.com/en/products/cameras-filtered-by-sensor-types/mq013cg-on] 2 pages (2023).

"Speckle (interference)," WikipediA, [retrieved from URL: https://en.wikipedia.org/wiki/Speckle_(interference)#Speckle_pattern], 12 pages (2023).

"The spin racket: Ping-pong champs are intuitive masers of fluid dynamics," ScienceDaily, 2 pages (2012).

"What makes lasers hazardous to aviation," [retrieved from URL: https://www.laserpointersafety.com/page52/laser-hazard_diagram/laser-hazard_diagram.html] 5 pages (2023).

Okumura, K., et al., "High-speed gaze controller for millisecond-order pan/tilt camera," 2011 IEEE International Conference on Robotics and Automation, pp. 6186-6191 (2011).

Singh, A., et al., "Table Tennis: A Research Platform for Agile Robotics," [retrieved from URL: https://ai.googleblog.com/2022/10/table-tennis-research-platform-for.html], 9 pages (2022).

Wang, Y., et al., "Machine Vision-Based Ping Pong Ball Rotation Trajectory Tracking Algorithm," Comput Intell Neurosci. 2022:1-2 (2022).

Widenhorn, R., "The physics of juggling a spinning ping-pong ball," Am. J. Phys., 84:936-942 (2016).

Zhang, Y., et al., "Spin observation and trajectory prediction of a ping-pong ball," 2014 IEEE International Conference on Robotics and Automation (ICRA), 4108-4114 (2014).

* cited by examiner

SYSTEMS AND METHODS FOR CAPTURING AND VISUALIZING THE SPINNING OF SMALL BALLS IN SPORTS

BACKGROUND

The present disclosure relates to detecting ball spin, and in particular to systems and methods for capturing and visualizing the spin of small balls in various sports.

SUMMARY

Small balls are ubiquitously used in sports. Some of the most popular sports today use small spherical balls. For example, baseball, billiards, cricket, golf, soccer, table tennis, and tennis are all very popular sports with large viewership that use small balls as part of the gameplay. Importantly, the spin imparted onto a ball greatly influences how the ball behaves during play of such games. For example, the spin imparted onto a ball changes how the ball travels in air, curving the ball in the direction of spin, known as the Magnus effect. Additionally, the ball's spin will cause the ball to deflect in the direction when the ball contacts a surface (e.g., the ground or other playing surface) or sporting implement (e.g., tennis racquet, table tennis paddle). In such instances, the competitors must recognize that the ball is spinning and understand how that spin will affect the ball during gameplay to account for the spin's influence on the ball. The competitors are able to do this in real time through visual inspection, i.e., seeing that the ball is rotating. However, user interfaces cannot convey the spin of a ball in a manner that is easily or intuitively understood. In one implementation, a camera may record a video of the ball during play. But it is difficult to capture a video of a ball travelling through the air in a manner than conveys spin. For example, slow motion cameras can be used to record a slow-motion video of the ball. However, this requires expensive equipment and requires post-processing to present a depiction of the ball's spin. Further, it presents logistical challenges. Such high-speed cameras are very large and cumbersome to operate and cannot be easily oriented at a small ball during flight. Moreover, even if such cameras were used, often times the balls used in sports are uniform in color and/or texture. For example, a table tennis ball is small, uniform, and travels very fast during game play. Even if a slow-motion camera were used and could capture a table tennis ball during an event, presenting the video in a way that conveys spin is almost impossible because table tennis balls do not have markings or other visual texture for reference. Available approaches to conveying the spin or other characteristics of a ball are deficient because they do not convey whether, how much, and in what direction a ball is spinning. User interface engagement is crucial not only to present the competition in a way that keeps the sport relevant, but also to grow the fan base of a given sport. In view of these deficiencies, there exists a need for improved systems and methods for detecting, capturing, and visualizing the spin and other characteristics of objects.

To solve these problems, systems and methods are provided herein for detecting and measuring characteristics of a ball during a sporting event, and further for presenting the detected characteristics. In an implementation, the disclosed system uses a camera to detect the location of an object (e.g., a ball used in a sporting event) and, based on the determined location, emits a laser beam at the object. The emitted laser beam interacts with the surface of the object and some of the emitted laser beam scatters off the object. The scattered laser returns in the opposite direction as the emitted laser beam (sometimes referred to as the "reflected beam" or the "returning beam"). The returning laser beam is detected using a photodetector. The photo detector captures the returning laser beam, which contains a speckle pattern caused by the emitted laser beam interacting with the object's surface. The system analyzes the detected speckle pattern over time to determine characteristics of the object. The system may optionally display the characteristics of the object.

In another implementation, the system may include a camera that detects and tracks an initial location of an object (e.g., a ball) being used in a sporting event. The camera may be embodied by any type of camera that can capture a series or a plurality of images (e.g., a video) of the object. In an exemplary embodiment, the camera is configured to capture video at a resolution of 1.2 MP and a framerate of 210 frames per second. However, any type of camera with any suitable framerate and resolution can be used. Additionally, any number of cameras can be used. In some embodiments, the camera is positioned at a location such that it can view the entire area of play. The system analyzes the information received from the camera to determine the location of the object (e.g., ball). For example, the system may apply a Kalman Filter or a Particle Filter to sample the video received from the camera to determine the object's (e.g., ball) location. Other techniques for detecting the location of the object (including other hardware of software) may be used in lieu of, or in addition to, the camera. For example, the object may contain an embedded sensor that indicates the location of the object.

The system may further include a laser emitter-detector that emits a laser beam at the object. In some embodiments, the laser emitter-detector comprises a laser diode (e.g., laser emitter), a photodetector, a plurality of mirrors, and a plurality of motors that are configured to move or reorient one or more of the mirrors to reorient the emitted laser beam. Any suitable type of laser emitter may be used. In some embodiments, the laser diode is configured to emit a laser beam that is safe for human use, i.e., will not cause harm if the laser is viewed by a person. Some embodiments use a visible light laser while other embodiments use lasers that are not visible to the human eye, for example, infrared laser. Additionally, the emitted laser may be safe for all conditions, eliminating the possibility of damaging a viewer's vision.

The system determines the object's location based on the information received by the camera and determine the object's location within the field of play. For example, the system may apply a Kalman Filter or a Particle Filter to sample the video received from the camera to determine the object's (e.g., ball) location. The system may utilize the information collected from the camera to direct a laser at the object while in play.

The system orients the direction of the laser beam by either moving the laser itself or by using a plurality of mirrors, each of which may be controlled by motor. In some embodiments, the mirrors and motors are components of a microelectromechanical system device (or MEMS device). In such embodiments, the MEMS device allows the system to reorient the laser quickly and with few moving parts. The laser beam interacts with the object's surface and, as a result, scatters off the object's surface. Part of the scattered laser beam, or the reflected beam, is directed back towards the laser emitter-detector. The system may further include an optical sensor that detects and captures the returning laser beam. When the laser beam is projected onto the object, the surface of the object causes the scattered laser to have a speckle pattern. This speckle pattern is detected by an optical sensor. In some embodiments, the optical sensor is configured to detect the speckle pattern at a frame rate of, for example, 6000 frames per second.

The system analyzes the speckle pattern to determine characteristics of the object. In such an approach, the system identifies a plurality of points in the speckle pattern and analyzes their movements over time to determine characteristics of the object. For example, the system may determine that the object is spinning and at what rate by assigning a plurality of vectors to each of the points that correlate to their detected movement, and determining that the sum of the vectors is zero. In another example, the system may determine that the object is both spinning and moving in a particular direction by determining that the sum of the vectors is something other than zero.

Once the characteristics are determined, the system can display the characteristics in a user interface. For example, the system may display a visualization that indicates the amount of, and direction of, the spin of the object. In some embodiments, the visualization can be numeric. For example, the system can display the spin of the object in revelations per minute, the axis of spin in degrees (or other suitable parameters), and the direction of the object as a cartesian or polar vector (or other suitable characterization). In other embodiments, the visualizations can be graphical. For example, the visualization is displayed independently or as a graphical overlay on a video feed. In such an embodiment, the visualization is displayed by superimposing the visualization over the object in, for example, a video feed. For example, the visualization may display an arrow and an axis of spin. In such an example, the size of the arrow may change proportionally to the detected spin, i.e., the greater the detected spin, the larger the arrow. In another example, the color of the arrow may vary depending on the detected spin, i.e., lower detected spin may result in the arrow being displayed green while higher detected spin may result in the arrow being displayed red.

In another example, the visualization depicts the spin of the object by superimposing a graphical element over the object while it is displayed on a display device. In some embodiments, the visualization depicts the spin of the object by spinning at a rate and on an axis correlated to the spin of the object. The visualization may spin at the same rate as the object, or it may spin at a rate faster or slower than object. For example, the visualization spins at a rate that is directly proportional the spin of the object. In such an example, the spin rate of the visualization is determined and scaled by a constant value to depict the spin of the visualization.

In another example, the visualization depicts the detected spin of the object by displaying it in a separate window along with a video feed. In such an example, the visualization depicts a graphical representation of the object and displays the spin and/or the axis of spin an object using the texture of the visualization to present the spin and axis of spin of the object.

Object data, including numerical representations, visualizations, or both, is displayed on a display device. For example, object data and/or visualizations are displayed on a television, projector, or other panel display, including those used in conjunction with a computer, tablet, cell phone, smart watch, or any other mobile device. Additionally, object data may be displayed by an augmented reality or virtual reality headset. Accordingly, using the techniques described herein, characteristics of an object can be detected, captured, and presented.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

Figure 1:
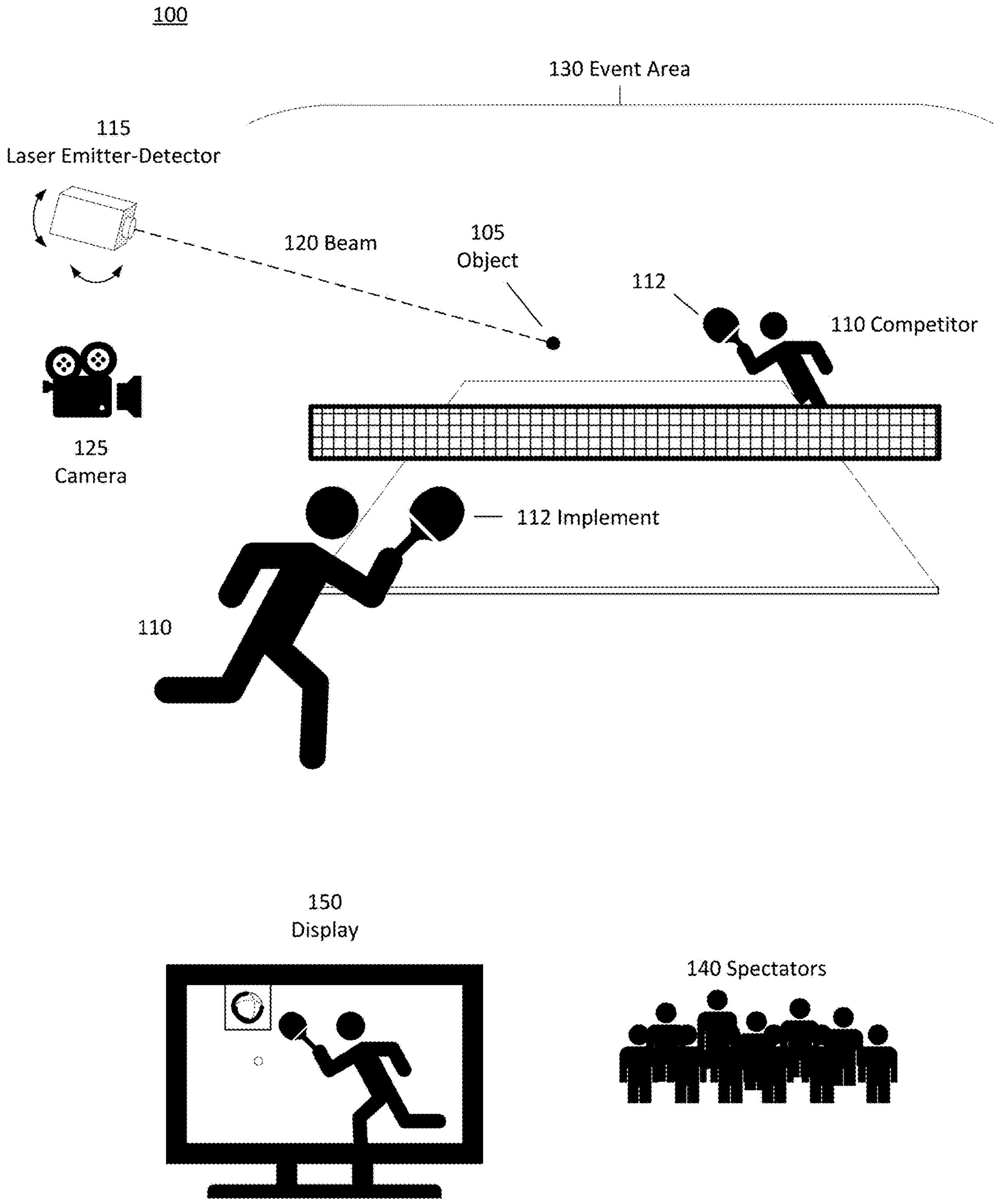
FIG. 1 depicts an illustrative diagram of a system for detecting, capturing, and visualizing the spinning of objects, in accordance with embodiments of the disclosure.

In an exemplary embodiment of the present disclosure and with reference to FIG. 1 the system includes laser emitter-detector 115 and camera 125. The laser emitter-detector 115 and camera 125 are configured such that they can see the entire competition area 130. As shown in FIG. 1, two competitors 110 are engaged in a sporting event, for example table tennis (also referred to as ping pong). Competitors 110 use sporting implement 112 to engage in the competition. As shown in FIG. 1, sporting implement 112 is embodied by a table tennis racquet or paddle (also referred to as a ping pong paddle). Competitors 110 use sporting implement 112 to send ball 105 back and forth across the playing area 130, commensurate with the rules of the game. As shown in the illustrative embodiment, camera 125 detects the location of ball 105 and orients laser emitter-detector 115, which emits laser 120 at ball 105. Laser emitter-detector 115 receives the returning (or reflected) laser beam 120 from ball 105 and system 100 processes that information to determine characteristics of ball 105 while ball 105 is being used in the sporting event. System 100 may display information relating to ball 105 on display equipment 150. Spectator 140 is able to view display equipment 150 at a remote location or, in some embodiments, at the same location where the sporting event is taking place.

Camera 125 may be embodied by any optical device or instrument that captures video or a series of still images in a manner that is suitable for the embodiments discussed herein. In an exemplary embodiment, camera 125 is embodied by a camera that captures video at 1.3 MP and a frame rate of 210 frames per second (fps). Although camera 125 may be depicted and discussed as having a particular resolution or frame rate, any camera capable of capturing still images or videos at any resolution or frame rate may be implemented without departing from the contemplated embodiments. Additionally, although the present disclosure may discuss implementations having a single camera, any number of cameras, including zero, may be used without departing from the contemplated embodiments. Once the position of ball 105 is captured, for example by camera 125, system 100 may apply a tracking and or trajectory prediction algorithm to determine the location of the ball and predict its movement. For example, the system may apply a Kalman Filter or a Particle Filter to sample the position and trajectory of ball 105 and predict its future position. In some embodiments, the application of a tracking and/or trajectory prediction algorithm is applied by circuitry contained in laser emitter-detector 115. In other embodiments, the algorithm is applied by other systems or devices herein, for example, server 560 control circuitry 562, I/O Path 564, storage 566, or user equipment 550, 552, 554 (discussed with respect to FIG. 5), or any other suitable system or device. In some embodiments, camera 125 is embodied by a lidar system. Light detection and ranging or laser imaging detection and ranging (referred to by its acronym LIDAR or LiDAR) determines ranges by targeting an object or a surface with a laser and measuring the time for the reflected light to return to a receiver. In such embodiments, a lidar system is implemented in addition to, or in lieu of, camera 125.

Although the systems and methods described herein may show and discuss implementing a camera to determine the location of an object and use that determined location to orient the laser, other techniques to determine the location of an object may be implemented without departing from the contemplated embodiments. In an exemplary embodiment, an initialization location is used where the laser is initially oriented to detect the object. For example, event area 130 may comprise a designated location where a competitor 110 or a third party (e.g., a referee) places the ball. In such an embodiment, system 100 may orient the laser 120 at the designated location and provide a notification that system 100 detects object 105. The designated location can be embodied by a specific location, for example, on the table tennis table. The designated location can also be embodiment by a competitor 110 or third party (e.g., a referee) holding the ball 105 in their hand at, for example, a position near the laser emitter-detector 115.

In another exemplary embodiment, system 100 may use a sensor or other device capable of relating its location of object 105. For example, ball 105 may have an RFID or other chip/sensor embedded therein to detect the location of ball 105. Such an embodiment may further include other sensors or other equipment included in competition area 130 that may assist in detecting the location of ball 105. Such hardware may, for example, be embedded within the table of a table tennis competition area 130 such that it is not visible to competitors 110 and does not interfere with gameplay.

In some embodiments of the present disclosure, system 100 includes display equipment 150. Display equipment 150 can be any device capable a visually transmitting information to a viewer or an audience. For example, display device 150 is embodied by a television or other device containing a display screen, for example, a computer monitor, a mobile device such as a cell phone or tablet, smartwatch, a virtual reality or augmented reality headset, a projector, or any other device containing a display.

Although the sporting event shown and described in FIG. 1 is a table tennis match, the systems and methods of the present disclosure can be used with any type of sporting event that uses a ball or other object. For example, the systems and methods disclosed herein may be used in sporting events including baseball, basketball, football, billiards, cricket, golf, soccer, table tennis, and tennis, among others, some exemplary embodiments of which are discussed herein.

Figure 2:
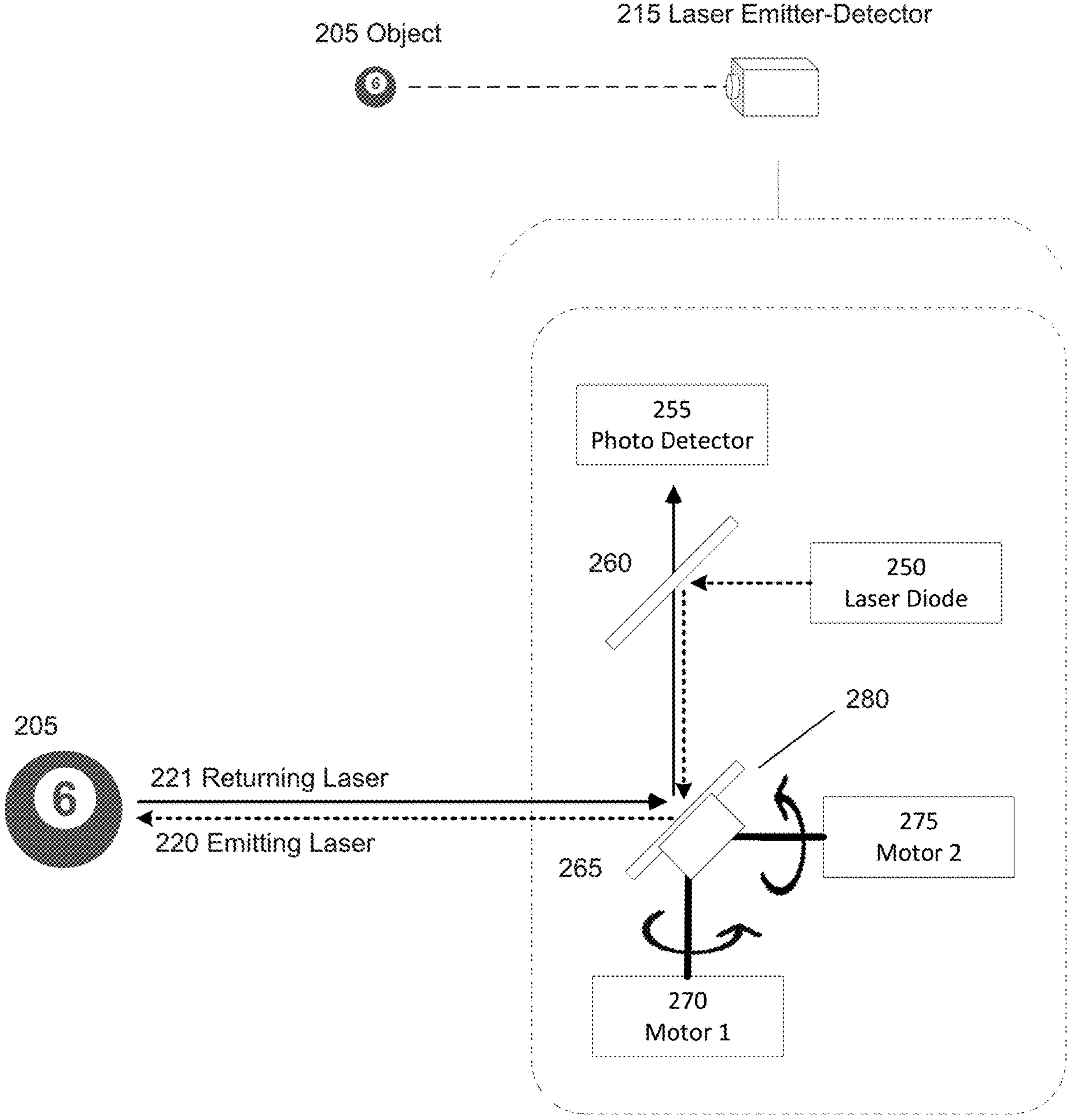
FIG. 2 depicts an illustrative diagram of a laser emitter-detector, in accordance with embodiments of the disclosure.

FIG. 2 depicts an illustrative diagram of laser emitter-detector 215, according to embodiments of the present disclosure. In an embodiment, laser emitter-detector 215 includes laser diode 250, photodetector 255, mirror 260, mirror 265, motor 1 270, and motor 2 275. In some embodiments, laser diode 250, photodetector 255, mirror 260, mirror 265, motor 1 270, and motor 2 275 are components of a microelectromechanical system device (or MEMS device) and included in laser emitter-detector 215. As illustrated, laser diode 250 emits laser beam 220 that is directed at mirror 260. Mirror 260 is oriented such that it directs the emitted laser beam 220 toward mirror 265. In some embodiments, mirror 265 is configured such that it is movable with motor 1 270 and motor 2 275. In other embodiments, yoke 280 may be used to translate the rotational and/or linear movement into rotational and/or linear movement, which can be scaled. In an embodiment, when mirror 1 270 is actuated, it causes mirror 265 to orient in a particular direction, for example horizontally. Additionally, when motor 2 275 is actuated, it causes mirror 265 to orient in a particular direction, for example, vertically. Because yoke 280 is able to reorient mirror 265 both horizontally and vertically, system 100 is able to direct the emitted laser beam 220 in any direction. In this way, the laser emitter-detector itself need not move to reorient the laser. Instead, mirror 265 is able to reorient emitted laser beam 220 to any direction within the field of play. In some embodiments, laser emitter-detector 215 is reorientable (in addition to mirror 265), thereby increasing the coverage area of emitting laser 220. Additionally, in some embodiments, motor 1 270 and motor 2 275 are configured to adjust mirror 265 in excess of 5000 Hz and, in such embodiments, is able to orient mirror 265 180 degrees in $1/10000^{th}$ of a second.

In an embodiment, laser emitter-detector 215 emits a laser beam at ball 205 and detects the reflection of the laser beam. As shown in FIG. 2 for example, mirror 265 directs laser beam 220 at ball 205. Although ball 205 may be shown and described as being embodied by a billiard ball, any type of ball can be used without departing from the contemplated embodiments. Laser beam 220 scatters (or reflects) off the surface of ball 205 and the returning laser beam 221 is directed at mirror 265. Mirror 265 directs returning laser beam 221 to mirror 260. Returning laser beam 221 passes through mirror 260 and is detected by photodetector 255.

Although mirrors 260 and 265 may be depicted and described as a traditional mirror, any device that reflects some or all of emitting laser 220 and/or returning laser 221 may be implemented according to the embodiments contemplated herein. For example, in some embodiments, mirror 260 and/or mirror 265 are embodied by a beam splitter (i.e., an optical component used to split incident light at a designated ratio into two separate beams, which include cube beam splitters and plate beam splitters).

Photodetector 255 may be embodied by any type of sensor capable of detecting light waves emitted by laser diode 250, including emitting laser 220 and returning laser 221. For example, photodetector 255 is embodied by a complementary metal oxide semiconductor (or CMOS) sensor. Additionally, photodetector 255 can have a resolution and frame rate suitable for capturing reflected light from my ball. In an exemplary embodiment, photodetector 255 or camera 125 are embodied by a CMOS sensor having a resolution of 1.3 megapixels and a capture rate of 210 frames per second. In other embodiments, photodetector 255 and/or camera 125 may include a CMOS sensor having a framerate in excess of 6,000 fps. Depending on the application (i.e., the spin rate of the object to be measured), certain embodiments may include CMOS sensors having framerates commensurate with the spin of the object, for example, CMOS sensors having framerates of over 10,000 fps. Although certain embodiments discussed herein may be shown and described as having particular resolutions and/or frame rates, any optical sensor having any suitable frame rate and/or resolution may be implemented without departing from the contemplated embodiments.

Laser Diode 250 may be embodied by any device capable of emitting light amplification by stimulated emission of radiation (i.e., a laser), for example, a semiconductor device that is supplied with electrical current and creates lasing conditions at the diode's junction. Any type of laser diode may be implemented without departing from the contemplated embodiments. For example, double heterostructure lasers, quantum well lasers, quantum cascade lasers, interband cascade lasers, separate confinement heterostructure lasers, distributed Bragg reflector lasers, distributed-feedback lasers, vertical-cavity surface-emitting laser (VCSEL), vertical-external-cavity surface-emitting laser (VECSEL), and external-cavity diode lasers may be implemented according to the embodiments contemplated herein. Additionally, lasers having any wavelength can be implemented. For example, visible light lasers having wavelengths of between approximately 405 nm to 670 nm and/or infrared lasers having wavelengths of between approximately 670 nm to 3400 nm may be implemented according to the embodiments contemplated here.

Although the systems and methods of the present disclosure show and describe the use of lasers, any optical device may be used without departing from the contemplating embodiments. For example, visible light, infrared light, or ultraviolet light may be used according to the embodiments discussed herein. In such embodiments, the light from the light source are focused to increase the coherence of the light emitted from the light sources. For example, light from non-laser light sources are focused to increase the coherence of the light.

Additionally, although the present disclosure may discuss and describe safety considerations as applied to lasers, lasers having any power output are implemented without departing from the contemplated embodiments. For example, lasers meeting IC 60825-1 Class 1 laser characteristics (or equivalent), which are classified as safe for all conditions, are implemented in particular exemplary embodiments discussed herein. However, lasers of any power output are implemented, up to an exceeding an IC 60825-1 Class 4 classification (or equivalent), are implemented without departing from the contemplated embodiments.

Figure 3:
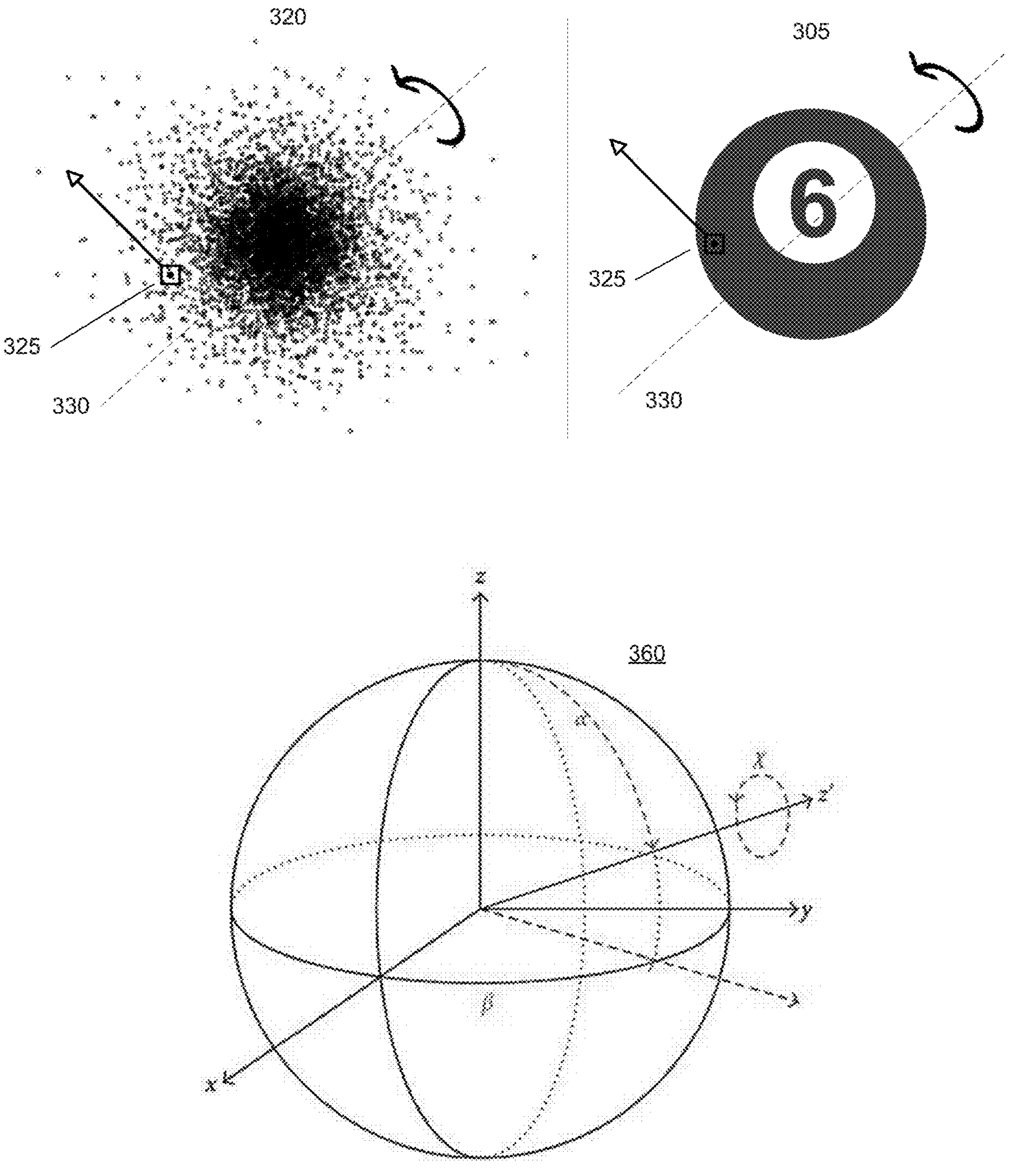
FIG. 3 depicts an illustrative diagram of a detected speckle pattern, in accordance with embodiments of the disclosure.

FIG. 3 depicts an illustrative embodiment of how the systems and methods of the present disclosure determine a ball's spin from a laser beam scattered (or reflected) off of a ball, for example, the returning laser 221 as received by photodetector 255 (as discussed with respect to FIG. 2). When a laser beam hits a surface, for example the surface of ball 305, some of the laser beam is scattered and returns in an opposite direction (e.g., returning laser 221 (as discussed with respect to FIG. 2)). When detected, for example by photodetector 255, the returning laser beam contains a speckle pattern also referred to as speckle noise. A speckle pattern (also referred to as speckle noise) is a granular noise texture reflected from an imperfect surface (such as a ball) lighted by a coherent lighting source, such as a laser beam. This is caused by the interference among wavefronts in coherent lighting so that when the scattered (or reflected) light arrives at the photodetector (e.g., photodetector 255), it will be inconsistent in phase. For example, some regions will have light waves building on one another (in phase), while other regions will have light waves canceling one another (out of phase). This creates a "noisy" texture. In other words, the speckle pattern contains granular noise texture that is created by the laser beam interacting with imperfections on a surface (e.g., the surface of ball 305). Since the laser beam (e.g., emitting laser 220 or returning laser 221) travels in parallel over long distances, the speckle pattern can be detected at far distances without the need to adjust the focal length of the detector (e.g., photodetector 255).

As shown in FIG. 3, the speckle pattern contains many light and dark areas, illustrated by a plurality of dots. System 100 analyzes the movement of the dots in speckle pattern 320 over time to determine the spin and movement of ball 305. For example, dot 325 moves in a specific direction, as indicated by the arrow. As ball 305 rotates around axis 330, the dots move in a particular way. As shown in spin visualizer 360, the three-dimensional axis can be uniquely specified by two angles $\alpha$ and $\beta$ in three-dimensional space. The rotational speed (e.g., in revolutions per minute) is denoted by X and is a single scalar value that can be positive or negative. Thus, the system has three unknowns to be solved. An exemplary technique for determining the movement of the speckle pattern include optical flow (or optic flow) analysis. Optical flow analysis analyzes the pattern of apparent motion of objects, surfaces, and edges in a visual scene caused by the relative motion between an observer and the scene. Optical flow can also be defined as a distribution of apparent velocities of movements of brightness patterns in an image. Optical flow analysis techniques include phase correlation, block-based methods, differential methods of estimating optical flow (including the Lucas-Kanade method, the Horn Lock-Schunck method, the Buxton-Buxton method, the Black-Jepsen method, and the general variational method), and discrete optimization methods. Although certain techniques for determining the movement of the speckle pattern 320 are shown and discussed, any technique for analyzing and determining the movement of the speckle pattern are implemented without departing from the contemplated embodiments.

In some embodiments, a single laser, resulting in detecting a single speckle pattern is implemented. In other embodiments, two or more lasers, resulting in multiple detected speckle patterns are implemented without departing from the contemplated embodiments. Although a single laser may be used, embodiments implementing multiple lasers may increase the robustness, accuracy, or redundancy of the methods and systems discussed herein.

Figure 4:
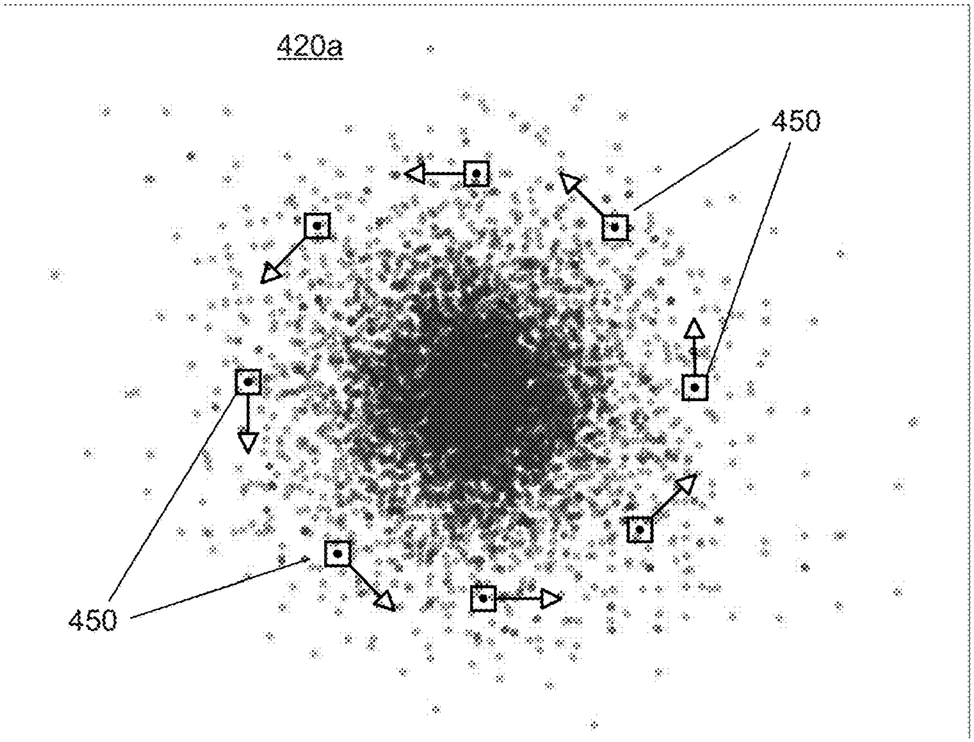
FIG. 4 depicts illustrative diagrams of a detected speckle pattern, in accordance with embodiments of the disclosure.
Figure 4:
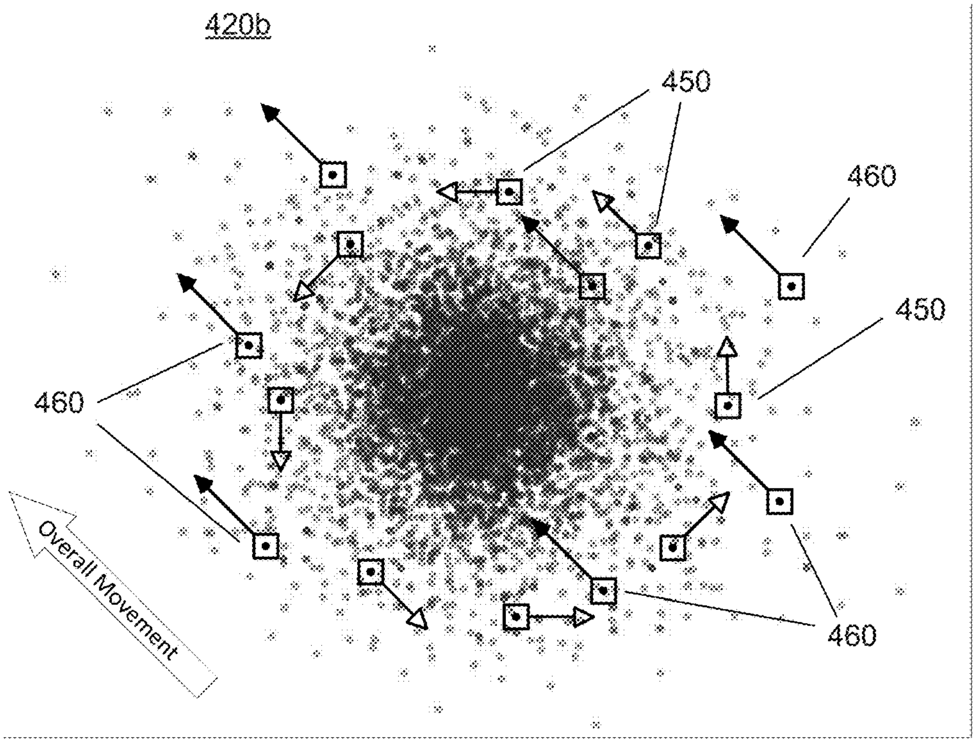

FIG. 4 depicts illustrative embodiments of speckle patterns 420*a* and 420*b* detected by a photodetector (e.g., photodetector 255). Speckle pattern 420*a* illustrates the detected pattern when the center of a ball (e.g., ball 105, 205, 305) is stationary while the ball is spinning (i.e., the ball is only experiencing rotational movement). As illustrated by speckle pattern 420*a*, the detected optical flow of the plurality of dots with rotational vectors 450 forms a closed loop—that is, the summation of vectors 450 is zero. Speckle pattern 420*b* illustrates the detected pattern when the center of a ball (e.g., ball 105, 205, 305) is moving while the ball is spinning (i.e., the ball is experiencing both rotational and translational movement). As illustrated by speckle pattern 420*b*, the detected optical flow of the plurality of dots 450 forms a closed loop (the summation of vectors 450 is zero) and also contains a plurality of translational vectors 460. Thus, the summation of all the vectors depicted in speckle pattern 420*b* indicate that the ball is spinning and moving in a particular direction.

Figure 5:
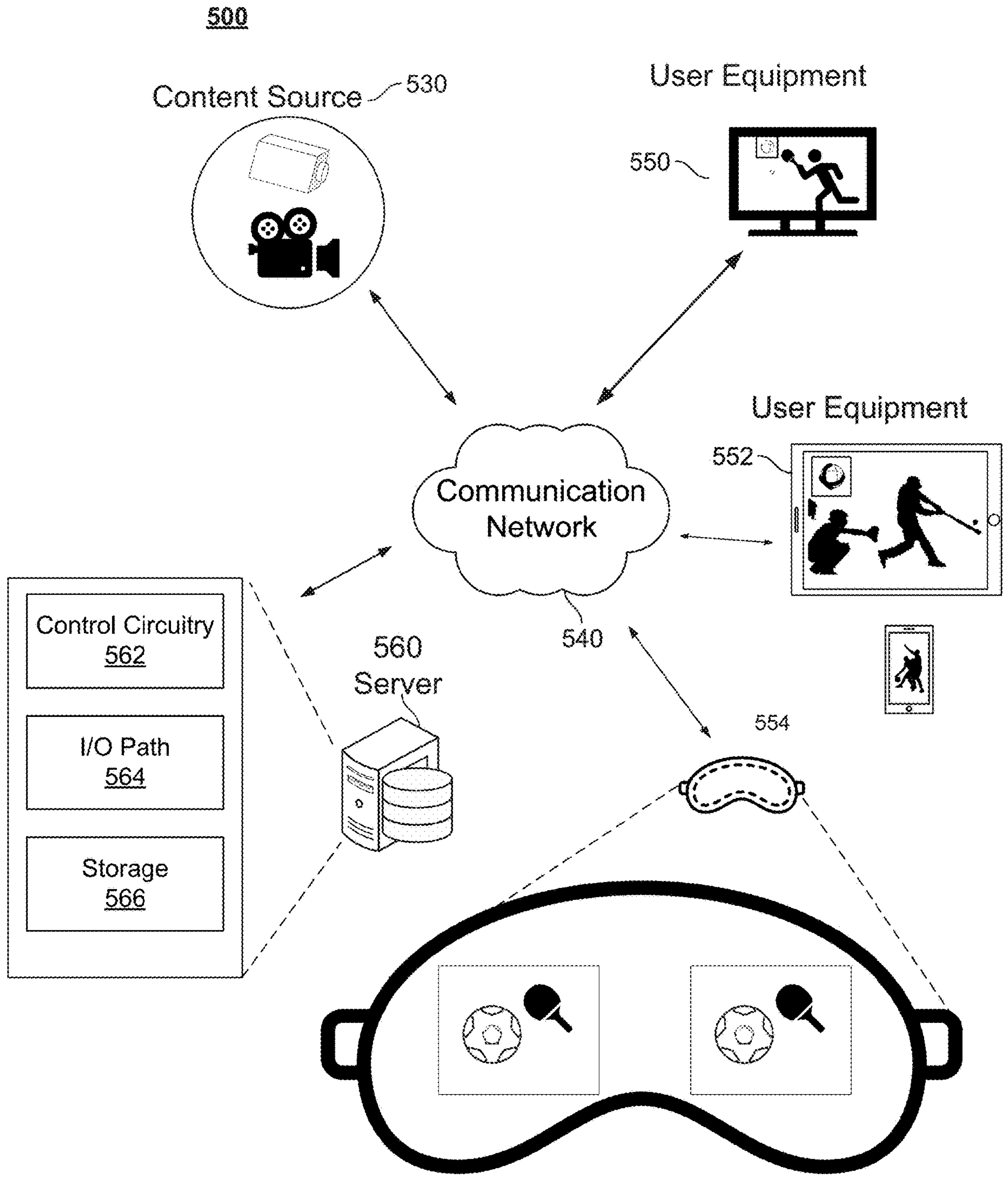
FIG. 5 depicts an illustrative diagram of a distributing content, in accordance with embodiments of the disclosure.

FIG. 5 depicts an illustrative embodiment of distributing information captured by the systems and methods discussed herein. As depicted, content source 530 distributes content (i.e., information) over communication network 540 to user equipment 550, 552, and 554, and server 560. Content source 530 includes one or more systems and devices discussed herein, for example, laser emitter-detector 115, 215, and camera 125. In an exemplary embodiment, information gathered by content source devices 530 is communicated to server 560 through communication network 540. Server 560 receives information from content source 530 by, for example, I/O path 564. Server 560 may further include control circuitry 562 and storage 566, one or more of which may be used to implement the systems and methods described herein. For example, the tracking and trajectory prediction algorithm discussed with respect to FIG. 1 is implemented at server 560 by control circuitry 562. Additionally, information gathered from content source 530 may be stored on storage device 566. In some embodiments, control circuitry 562 is used to analyze data gathered by content source 530 to determine characteristics of a ball during an event, for example spin characteristics, trajectory characteristics (including angle, speed, and launch trajectory), and other parameters. In an embodiment, content source devices 530 (e.g., laser emitter-detector 115, 215, and camera 125 as discussed with respect to FIG. 1) are used to detect the characteristics of implements used during the competition, for example, sporting implement 112. In such an embodiment, one or more of components of server 560 (for example, control circuitry 562, IO path 564, storage 566) are used to determine the characteristics of the sporting implements and further to send those characteristics to user equipment devices for display, for example user equipment 550, 552, 554. In some embodiments, communication network 540 includes any wired or wireless network over which data may be suitably sent or received, according to the embodiments discussed herein.

User equipment devices are used to display information gathered and analyzed by the systems and methods described herein. For example, user equipment by 550 is embodied by a television, projector, or the display device that is used the display the information to one or more audience members, for example spectators 140 (as discussed with respect to FIG. 1). User equipment 552 can be embodied by any mobile device, for example, a computer, a laptop computer, a tablet, or cell phone. In another embodiment, user equipment 554 is embodied by a virtual reality (VR) or augmented reality (AR) headset. In such an embodiment, user equipment 554 (a VR or AR headset) is used by an audience member, for example, spectator 140. In another embodiment, user equipment 554 (a VR or AR headset) is used by a competitor either during a sporting event or during a training session (such an example is discussed in more detail with respect to FIG. 6).

In an embodiment, one or more of the determined characteristics of the ball or other sporting implement used during a sporting event is subject to polling. For example, a viewer or an audience member (e.g., spectator 140) is be prompted with a polling question on a user equipment device, for example, user equipment 550, 552, or 554. In such an embodiment, the user is be prompted by a notification displayed on user equipment. Alternatively, the user themselves can initiate the polling. In such an embodiment, the polling prompt is transmitted through a communication network, for example communication network 540, to server 560. Components of server 560 may then respond to the prompt or, in some embodiments, distribute the prompt and the polling parameters to other viewers or audience members through their respective user equipment devices. In this way, a plurality of viewers or audience members can be subject to the polling either through being prompted by the system 500 or submitting a prompt to the system 500 for other users and/or viewers to participate. Additionally, in some embodiments, one or more of the users or audience members transmits financial information associated with the polling, for example, to server 560.

Figure 6:
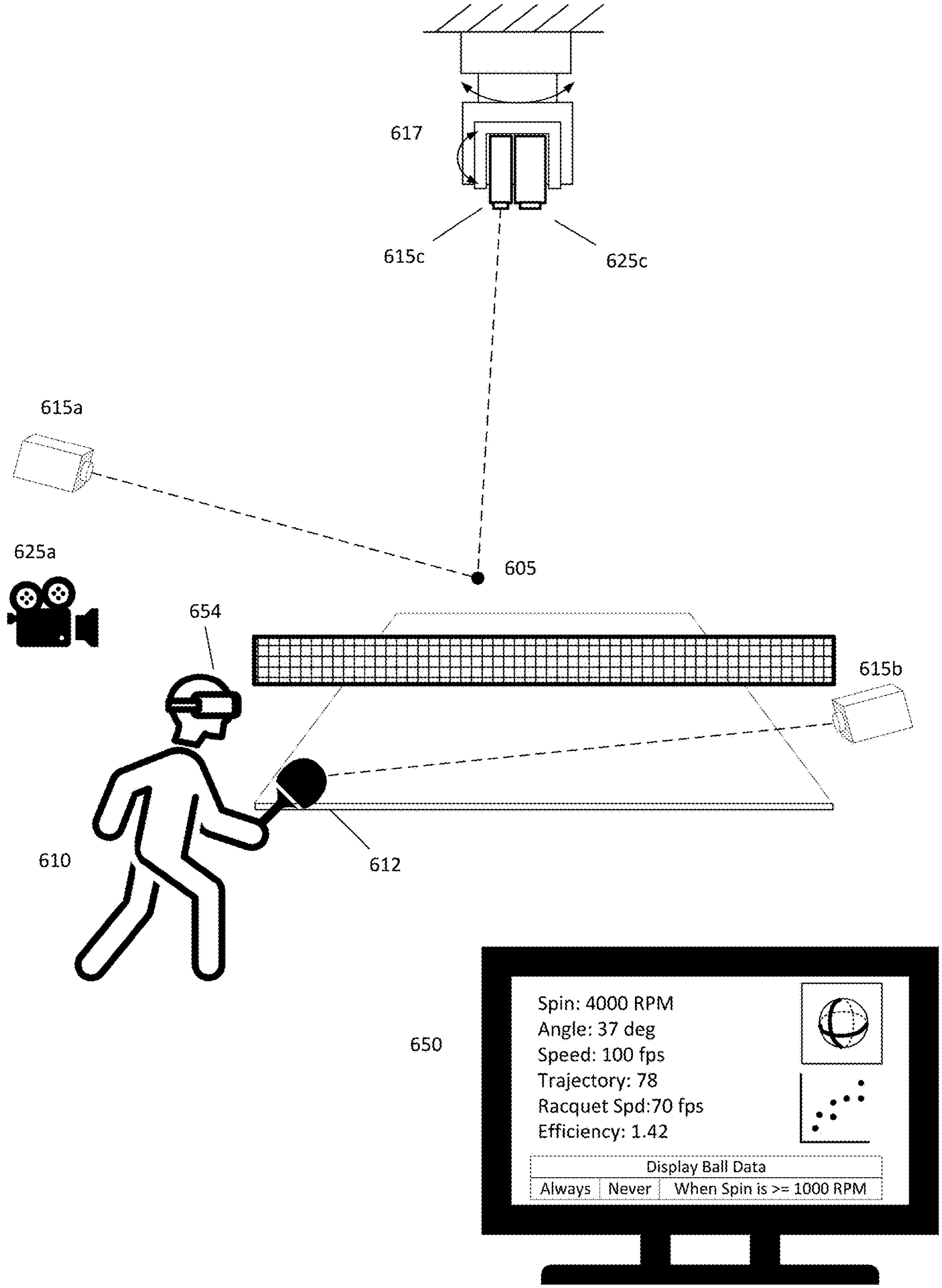
FIG. 6 depicts an illustrative diagram of a system for detecting, capturing, and visualizing the spinning of objects, in accordance with embodiments of the disclosure.

FIG. 6 depicts an illustrative embodiment of the present disclosure. As depicted, competitor 610 trains with sporting implement 612 and ball 605. In such an embodiment, camera 625*a* and laser emitter-detector 615*a* detects and tracks ball 605 during the training session. Additionally, camera-laser emitter-detector 617 comprises laser emitter-detector 615*c* and camera 625*c*. In such an embodiment, the camera and laser emitter detector are contained in a single unit. As depicted, camera-laser emitter-detector 617 is located at a position that can see the entire playing area, in this case, above (e.g., placed above the event area or mounted on a ceiling). In such an embodiment, camera-laser emitter-detector 617 can be used alone to detect and track ball 605. In other embodiments, camera-laser emitter-detector 617 can be used in conjunction with laser emitter-detector 615*a* and camera 625*a*. Such an embodiment increases the robustness of the detecting and tracking system discussed herein. Additionally, laser emitter-detector 615*b* can be used to detect the characteristics of sporting implement 612. In such an embodiment, information related to sporting implement 612 is detected, captured, analyzed, and displayed. One or more of the components of server 560 (e.g., control circuitry 562, IO path 564, storage 566) may be used to analyze and store data associated with sporting implement 612. Additionally, information relating to sporting implement 612 is distributed over a network (for example, communication network 540) to user equipment devices, for example, user equipment device 650 and user equipment device 654. As shown in FIG. 6, user equipment 650 is embodied by a television or the display device that competitor 610 can use to view certain information displayed thereon. In another embodiment, competitor 610 uses user equipment device 654. As shown, user equipment device 654 is a VR or AR headset, with which competitor 610 uses to view certain characteristics of ball 605. User equipment device 654 may be embodied by, for example, the AR or VR headset discussed as user equipment device 554 with respect to FIG. 5. In some embodiments, one or more of the detected characteristics are continuously displayed. In other embodiments, one or more of the detected characteristics are not displayed. In some embodiments, one or more of the detected characteristics are displayed if a characteristic is above or below a threshold. For example, system 600 may be configured such that the spin of object 605 is displayed only when the spin is greater than or equal to 1000 RPM. Such an embodiment is also conducive to generating replays. For example, if a particular play caused object 605 to exceed a predetermined speed or spin threshold, system 600 captures and stores relevant information (e.g., the information received from camera 625*a*, laser emitter-detector 615*a*, camera-laser emitter-detector 617, and/or laser emitter-detector 615*b*) associated with the detected event.

Another advantage to the embodiment depicted in FIG. 6 (i.e., implementing a laser emitter-detector 615*b* to detect the characteristics of sporting implement 612 in addition to detecting the characteristics of ball 605) enables the system to determine and display information relating to both. For example, the system can detect and analyze the interaction between ball 605 and sporting implement 612 such that it can determine that the sporting implement moved at approximately 70 feet per second (the racket speed) and after being hit by sporting implement 612, ball 605 traveled at a speed of 100 feet per second, resulting in efficiency of 1.42 (100/70=1.42), as depicted on display device 650. In some embodiments, display device 650 can display other information, for example, graphical information relating to sporting implement 612, ball 605, or competitor 610. Although certain characteristics are shown described as being displayed on display device 650, display device 650 can display any information without departing from the contemplated embodiments.

In addition to detecting, collecting, and analyzing information relating to a sporting event, some embodiments of the systems and methods of the present disclosure also generate and display visualizations. Such visualizations assist with understanding the characteristics of balls and other objects used in, for example, sporting events. For example, table tennis balls are typically small, uniform in color, move fast, and can experience rotational velocities exceeding 8,000 RPM. Since it is very difficult to see the spin of such an object with the naked eye or through recorded video, the visualizations generated and displayed by the systems and methods of the present disclosure assist competitors and audiences alike.

Figure 7A:
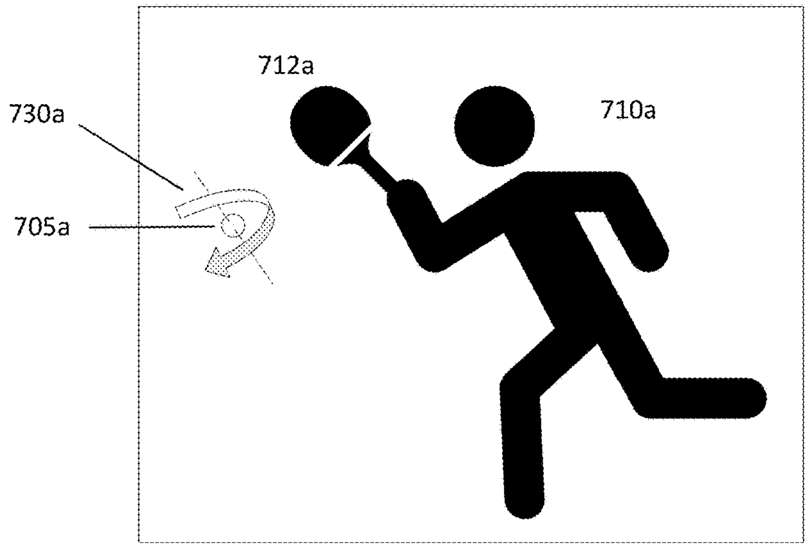
FIGS. 7A-7C depict illustrative diagrams of visualizations relating to the spinning of objects, in accordance with embodiments of the disclosure.
Figure 7B:
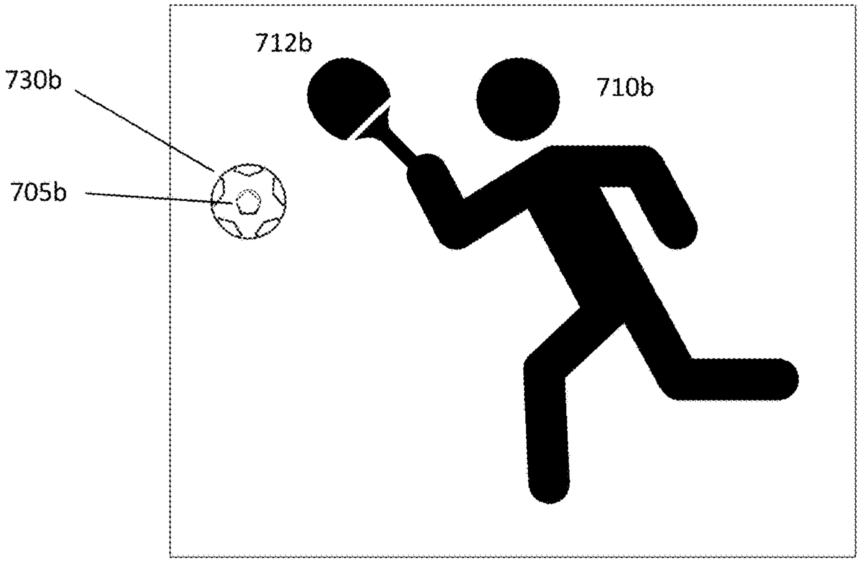
Figure 7C:
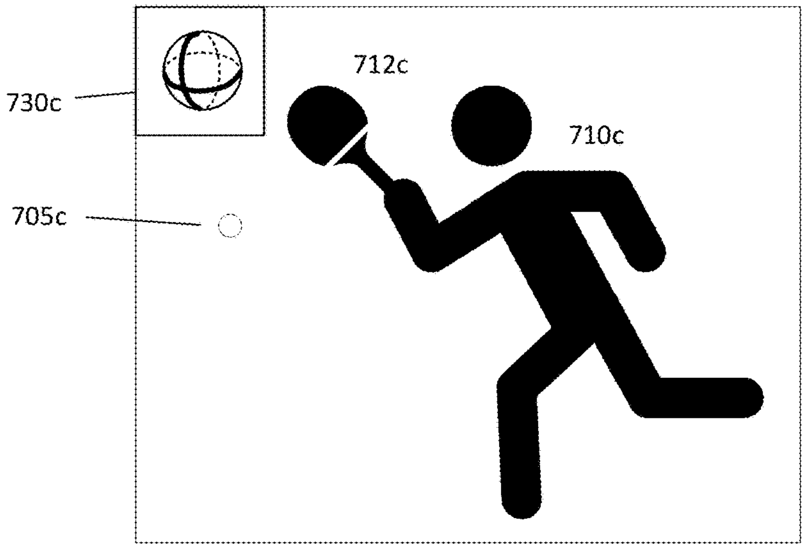

FIGS. 7A-7C depict illustrative embodiments of visualizations generated and displayed of the systems and methods of the present disclosure. The visualizations generated and displayed, for example, that was shown and described and FIGS. 7A through 7C, can be displayed on any type of display device without departing from the contemplated embodiments. For example, the visualizations are displayed on display device 150 (as shown and described with respect to FIG. 1), user equipment 550 user equipment 552, user equipment 554 (as shown and described for this spec to FIG. 5) and display device 650, as described with respect to FIG. 6. The illustrative embodiments of visualizations depicted in FIGS. 7A-7C include competitor 710*a-c* and sporting implement 712*a-c*.

In an exemplary embodiment and with reference to FIG. 7A, visualization 730A is displayed showing information relating to ball 705A. As depicted, visualization 730A shows the spin of ball 705A along with the axis of spin that ball 705A experiences. In some embodiments, the arrow indicating the direction of spin of ball 705A is configured such that its display parameters vary according to the detected characteristics of ball 705A. In such an embodiment, the size, shape, and/or color of the arrow depicted in visualization 730*a* is altered depending on the detected characteristics. For example, the size of the arrow may change proportionally to the detected spin, i.e., the greater the detected spin, the larger the arrow. In another example, the color of the arrow may vary depending on the detected spin, i.e., lower detected spin may result in the arrow being displayed green while higher detected spin may result in the arrow being displayed red. In this way, visualization 730A conveys certain characteristics and the relative amount of those certain characteristics to an observer.

In another exemplary embodiment and with reference to FIG. 7B, visualization 730*b* is displayed showing information relating to ball 705*b*. Visualization 730*b* depicts the spin of ball 705*b* by superimposing visualization 730*b* over ball 705*b* being displayed on a display device. In some embodiments, visualization 730*b* depicts the spin of ball 705*b* by spinning at a rate and on an axis correlated to the spin of ball 705*b*. Visualization 730*b* may spin at the same rate as ball 705*b*. In other embodiments, visualization 730*b* spins at a rate slower than ball 705*b*. For example, visualization 730*b* may spin at a rate that is directly proportional the spin of ball 705*b*. In such an example, the spin rate of visualization 730*b* is determined and scaled by a constant value to depict the spin of visualization 730*b*. For example, visualization 730*b* may spin at a rate that is 1/10 the detected spin rate of ball 705*b*. In such an example, the spin of ball 705*b* is detected to be 5000 RPM and visualization 730*b* is depicted as spinning at a rate of 500 RPM. In this way, the systems and methods of the present disclosure display characteristics of a ball to a viewer that is intuitively understood.

In another exemplary embodiment and with reference to FIG. 7C, visualization 730*c* is displayed showing information relating to ball 705*c*. Visualization 730*c* depicts the detected spin of ball 705*c* by displaying visualization 730*c* in a separate window along with a video feed. In such an embodiment, visualization 730*c* depicts a graphical representation of a ball and displays the spin and/or the axis of spin a ball 705*c*. Although visualization 730*c* depicts the spin of ball 705*c* through visual texture via two circumferential lines circumscribing visualization 730*c*, any visual texture may be added to visualization 730*c* to enable a viewer to visually infer the spin and/or the axis of spin a ball 705*c*. For example, a visual texture including a checkerboard pattern is implemented. Although visualization 730*c* is shown as a window in the top left corner, visualization 730*c* may be depicted at any location inside the window displayed as FIG. 7C.

Although visualizations depicted in FIGS. 7A, 7B, and 7C depict a single visualization, any number of visualizations may be used without departing from the contemplated embodiments. For example, visualization 730*b* depicted in FIG. 7B can be used in conjunction with visualization 730*c* as depicted in FIG. 7C.

Figure 8:
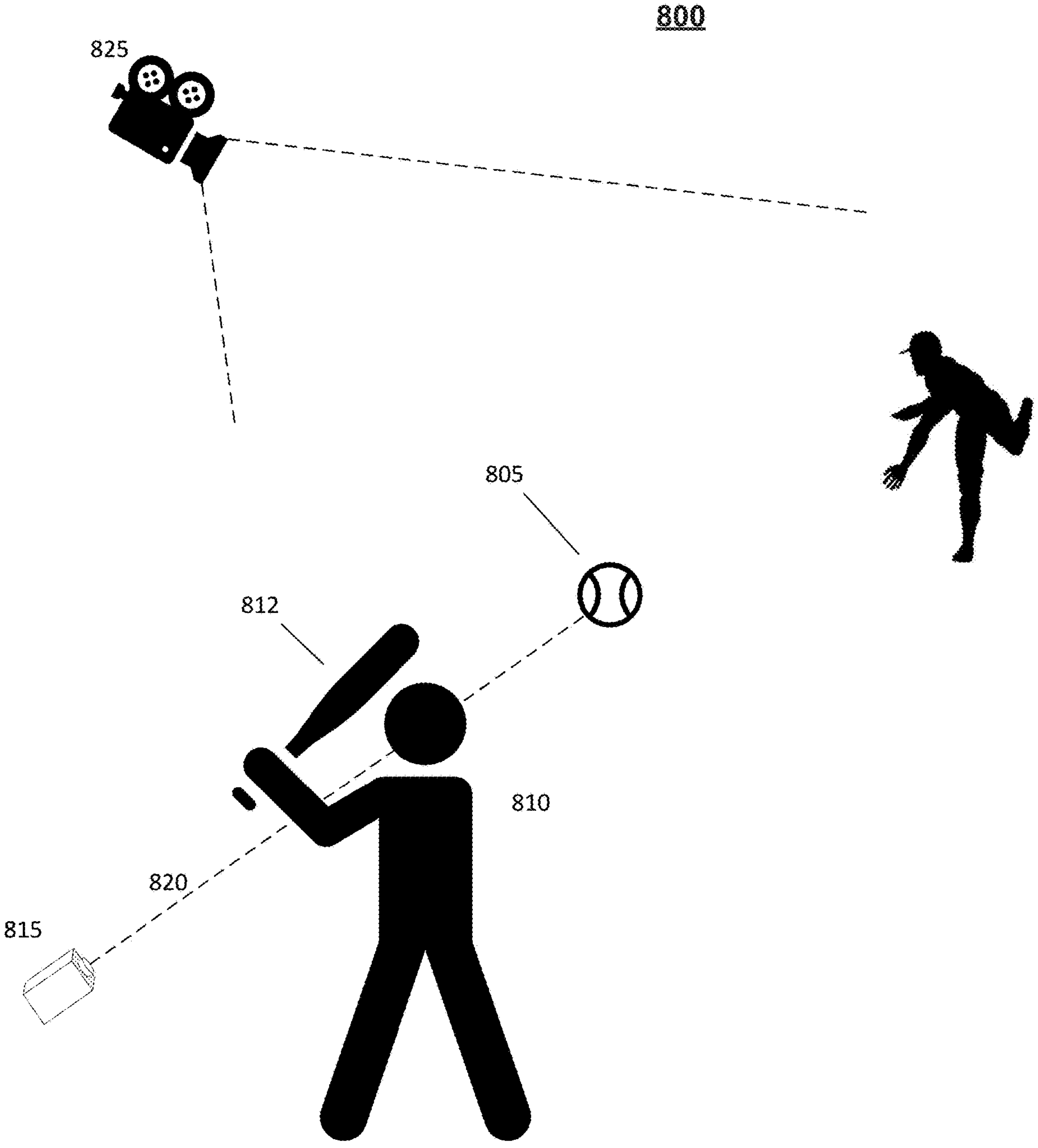
FIG. 8 depicts an illustrative diagram of a system for detecting, capturing, and visualizing the spinning of objects, in accordance with embodiments of the disclosure.

FIG. 8 depicts an illustrative embodiment of the present disclosure implemented with respect to a baseball or softball sporting event. In an exemplary embodiment and with reference to FIG. 8, camera 825 views the event area (e.g., the infield area of a baseball or softball field) and laser emitter-detector 815 emits laser beam 820 directed at ball 805. In some embodiments, camera 825 detects an initial location of ball 805 and enables system 800 to orient laser beam 820 at ball 805. In the illustrative embodiment of FIG. 8, camera 825 is located at a different location than laser emitter-detector 815. In such an example, camera 825 is located above and perpendicular to the pitcher and batter, while laser emitter-detector 815 is located behind the batter 810, such that it directs laser beam 820 towards the pitcher. In this way, laser emitter-detector 815 is better situated to direct laser beam 820 at ball 805 as it is being pitched towards batter 810. Although a single camera 825 and a single laser emitter-detector 815 are shown as being implemented, any number of cameras and laser devices may be used without departing from the contemplated embodiments.

Figure 9:
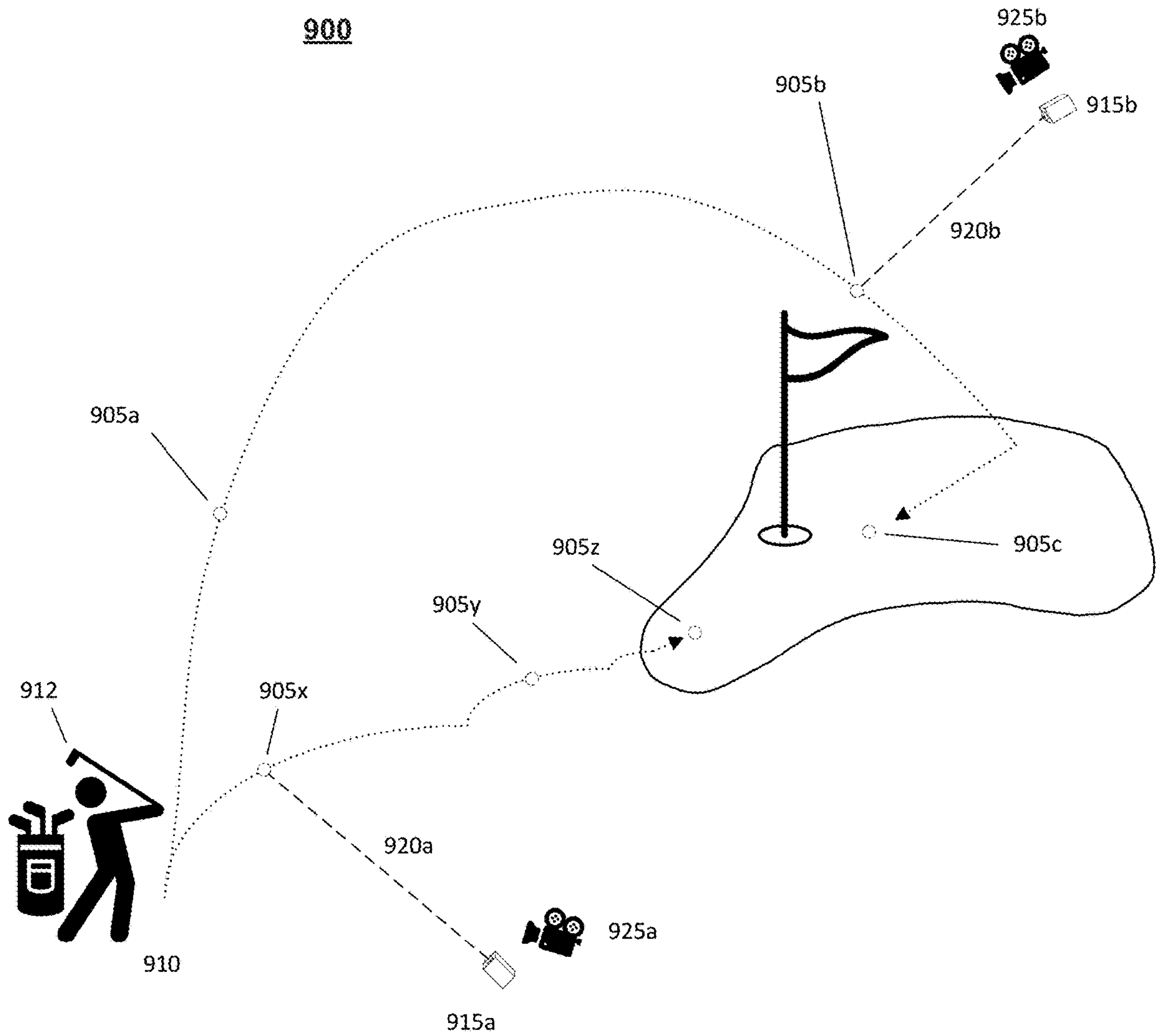
FIG. 9 depicts an illustrative diagram of a system for detecting, capturing, and visualizing the spinning of objects, in accordance with embodiments of the disclosure.

FIG. 9 depicts an illustrative embodiment of the present disclosure implemented with respect to a golf event. In an exemplary embodiment and with respect to FIG. 9, competitor 910 uses sporting implement 912 (i.e., a golf club) to hit ball 905 towards the hole. The sport of golf often requires players to hit balls hundreds of yards. Although the systems and methods described herein are configurable to detect and track a golf ball over hundreds of yards, the extended distances between the golfer and where the ball comes to rest increases the possibility that the laser emitter-detectors will not have line of sight to the ball for the duration of the ball's travel. For example, spectators, trees, hills, buildings, and other objects can easily interrupt the line of sight over the course of hundreds of yards. To minimize the possibility of an obstructed view, multiple laser emitter-detectors 915 and cameras 925 may be implemented. For example, laser emitter-detector 915*a* and camera 925*a* are located near competitor 910. Additionally, laser emitter detecting device 915*b* and camera 925*b* may be located near the ball's final location. Such an embodiment increases the robustness of the system. Depicted are two different ball paths, illustrated by ball 905*a-c* and 905*x-z*.

In an exemplary embodiment, competitor at 910 hits ball 905*a*, which travels through the air to position 905*b*, hitting the green and resulting in ball placement 905*c*. In such an embodiment, ball 905*a-c* experiences a much higher spin rate, which allows ball 905*a* to fly higher and, when ball 905*b* hits the green, the spin rate causes the ball to spin back towards the flag, resulting in ball placement 905*c*. As shown, laser emitter-detector 915*b* and camera 925*b* detect and track the location of ball 905*b* as it approaches the green.

In another embodiment, competitor 910 hits ball 905*x* with a lower spin rate and lower trajectory, which hops to position 905*y*, resulting in ball position 905*z*. In such an embodiment, the amount of spin imparted on ball 905*x* is much lower than is imparted on ball 905*a*, resulting in the ball's ability to roll to the hole. In such an embodiment, camera 925*a* and laser emitter-detector 915*a* emit laser beam 920*a* at ball 905*x*. As ball 905*x* continues on its path to 905*y* and 905*z*, laser emitter-detector 915*a* and camera 925*a* detect the ball's location until it comes to its final resting place, depicted by ball 905*z*.

Although FIG. 9 depicts two embodiments-a first embodiment where the laser emitter-detector 915*a* and camera 925*a* are located near competitor 910*a*; and a second embodiment where laser emitter-detector 915*b* and camera 925*b* are located near ball 905*c*—any number of laser emitter detecting devices 915 and/or cameras 925 may be implemented without departing from the contemplated embodiments. Additionally, laser emitter-detectors 915 and cameras 925 may be placed at any location, including near competitor 910 or the ball's intended final destination, or anywhere in between, without departing from the contemplated embodiments.

Figure 10:
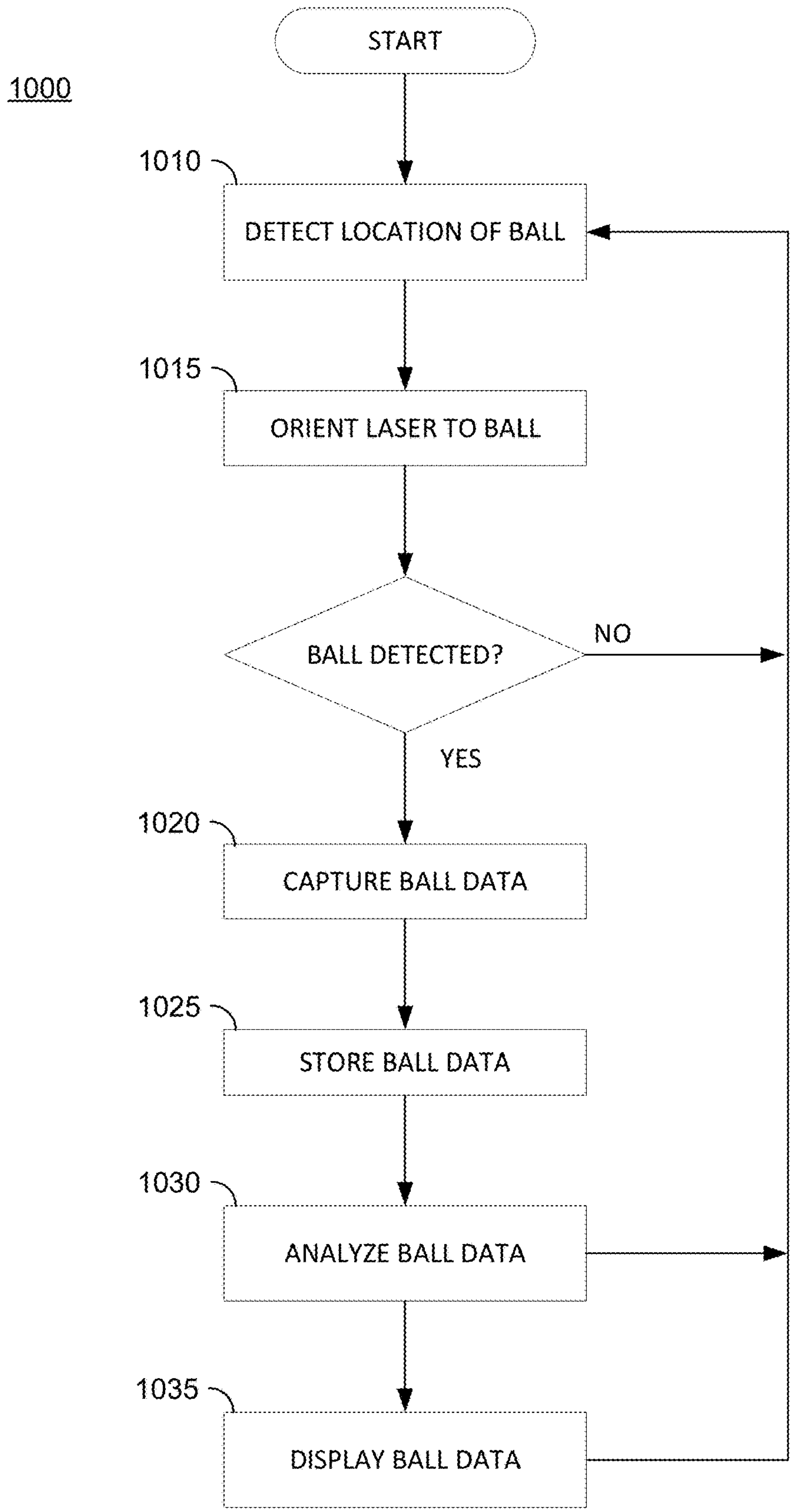
FIG. 10 depicts an illustrative flowchart of a process for detecting, capturing, and visualizing the spinning of objects, in accordance with embodiments of the disclosure.

FIG. 10 depicts an illustrative flow chart of a process 1000 for capturing and visualizing the spinning and location of balls, in accordance with embodiments of the present disclosure.

At step 1010, control circuitry (e.g., control circuitry 562 as discussed with respect to FIG. 5) detects the location of a ball. In some embodiments, system 1000 uses a camera (e.g., camera 125 as discussed with respect to FIG. 1; camera 625*a* and camera 625*c* as discussed with respect to FIG. 6; camera 825 as discussed with respect to FIG. 8; cameras 925*a-b* as discussed with respect to FIG. 9) to view the ball. System 1000 applies an algorithm to detect and track the location of the ball within the video captured by the camera. As the discussed herein, an algorithm such as a Kalman filter or particle filter may be used to sample the position and trajectory of the fall to determine its location. In other embodiments, the location of the ball may be detected in other ways. For example, the location of the ball is received from sources such as a sensor embedded within the ball.

At step 1015, system 1000 orients the laser to the ball. In an embodiment, system 1000 uses the detected location of the ball (for example, the location detected at step 1010) to orient the laser at the ball, according to the systems and methods discussed herein. For example, system 1000 may use a laser diode to emit a laser beam at a plurality of mirrors. One of the plurality of mirrors may be orientable by using one or more motors. In such an embodiment, the laser emitter-detector containing the laser diode, the plurality mirrors, and the plurality of motors may remain stationary while the laser beam is directed at the ball. A non-limiting example of such an embodiment is discussed herein, for example with respect to FIG. 2. In another exemplary embodiment, the laser emitter-detector itself is reoriented so that the laser is directed at the ball. Although system 1000 may be shown and described as directing a single laser beam at the ball, any number of laser beams may be implemented without departing from the contemplated embodiments.

At step 1020 system 1000 captures the ball's data. In an embodiment, system 1000 emits a laser beam at the ball, and receives the returning (reflected) beam, containing a speckle pattern. For example, system 1000 may include a photodetector that detects the returning laser beam after interacting with (or scattered from) the surface of a ball. In such an example, the returning laser beam is reflected off one or more mirrors. One of the mirrors may be embodied by a beam splitter, which allows the returning laser beam to follow a similar path as the emitted laser beam, while allowing the returning laser beam to pass through the beam splitter to a photodetector. Exemplary photodetectors, mirrors, and lasers are discussed herein, for example with respect to FIG. 2. Exemplary speckle patterns detected by photodetector are discussed herein, for example speckle pattern 320 (as discussed with respect to FIG. 3); speckle pattern 420*a* and speckle pattern 420*b* (as discussed with respect to FIG. 4).

At step 1025, system 1000 stores the balls data that was captured, for example, at step 1020. The data may be stored either in temporary memory (e.g., RAM) or permanent memory (e.g., hard drive), or in any other storage device suitable for the implementation of the embodiments discussed herein (e.g., storage 566 discussed with respect to FIG. 5). In some embodiments, the data is communicated over communication network (e.g., communication network 540 as discussed with respect to FIG. 5) to be stored at a location remote to the laser emitter-detector or the photodetector. For example, the data is communicated over communication network 540 and stored at server 560, for example, at storage device 566 (as discussed with respect to FIG. 5). Additionally, the data may be stored at a location local to the laser emitter-detector and or the photodetector (e.g., photodetector 255 discussed with respect to FIG. 2). In such an embodiment, the storage device is connected directly to the photodetector. In a similar embodiment, the data is stored in a storage device housed within the laser emitter-detector.

At step 1030, system 1000 analyzes the ball's data captured, for example, at step 1020. In an embodiment, the returning laser beam detected by the photodetector contains speckle pattern that is caused by, for example, the interference among wavefronts and coherent lighting so that when the returning beam arrives at the photodetector, it will be inconsistent in phase. For example, some regions will have light waves building on one another (i.e., in phase), while other regions will have light waves cancelling each other out (i.e., out of phase). This creates a "noisy" texture. In other words, the speckle pattern contains granular noise texture that is created by the laser beam interacting with imperfections on the surface of a ball. The speckle pattern is discussed herein, for example speckle pattern 320 (discussed with respect to FIG. 3), and speckle pattern 420*a* and speckle pattern 420*b* (discussed with respect to FIG. 4). The speckle pattern received by a photodetector contains many light and dark areas that system 1000 analyzes to determine the movement of the light and dark areas in the speckle pattern over time. System 1000 analyzes the movement of the speckle pattern overtime by, for example, identifying certain points (or dots) within the speckle pattern and tracking them over time. This allows system 1000 to determine whether the ball is experiencing rotational movement (i.e., spin), translational movement (i.e., movement in a linear direction), or a combination of the two. Exemplary methods for determining the ball's spin by analyzing the speckle pattern is discussed herein, for example with respect to FIG. 3 and FIG. 4. In embodiments containing multiple laser emitter detecting devices, system 1000 may analyze the received speckle patterns individually and combine the results to determine the ball's characteristics. Additionally, in such an embodiment, system 1000 compares the results determined from the two or more speckle patterns to determine a confidence level. System 1000 may perform the analysis locally or, in other embodiments, at a computing device remote to the laser emitter-detector and the photodetector. For example, the analysis is undertaken at server 560, by control circuitry 562 (as discussed with respect to FIG. 5). In other embodiments, the analysis may be undertaken by control circuitry local to the emitter or the photodetector, for example, by control circuitry contained within the photo emitter and detecting device.

At step 1035, system 1000 displays the ball data. In an embodiment, the ball data is displayed numerically. For example, ball characteristics including ball spin, ball speed, ball trajectory, or any other information relevant to the ball is displayed in a numerical fashion. Such information is discussed herein, for example as displayed on user equipment 650 (discussed with respect to FIG. 6). In other embodiments, system 1000 may display the ball data as a visualization. In such an exemplary embodiment, the visualization is displayed independently or as an overlay on a video feed. And other embodiments, the visualization is displayed by superimposing the visualization over the ball in, for example, a video feed. Exemplary visualizations the system 1000 may display are discussed herein, for example visualization 730*a*, visualization 730*b*, visualization 730*c* (as discussed with respect to FIGS. 7A, 7B, and 7C). Ball data, including numerical representations, visualizations, or both, may be displayed on any display device, without departing from the contemplated embodiments. For example, ball data is displayed on a television, projector, or other panel display, including those contained in a computer, tablet, cell phone, smart watch, or any other mobile device. Additionally, ball data may be displayed by an augmented reality or virtual reality headset. Exemplary display devices on which ball data may be displayed by system 1000 are discussed herein. For example, displayed device 150 (as discussed with respect to FIG. 1); user equipment 550, user equipment 552, and user equipment 554 (as discussed with respect to FIG. 5); and display device 650 (as discussed with respect to FIG. 6).

Figure 11:
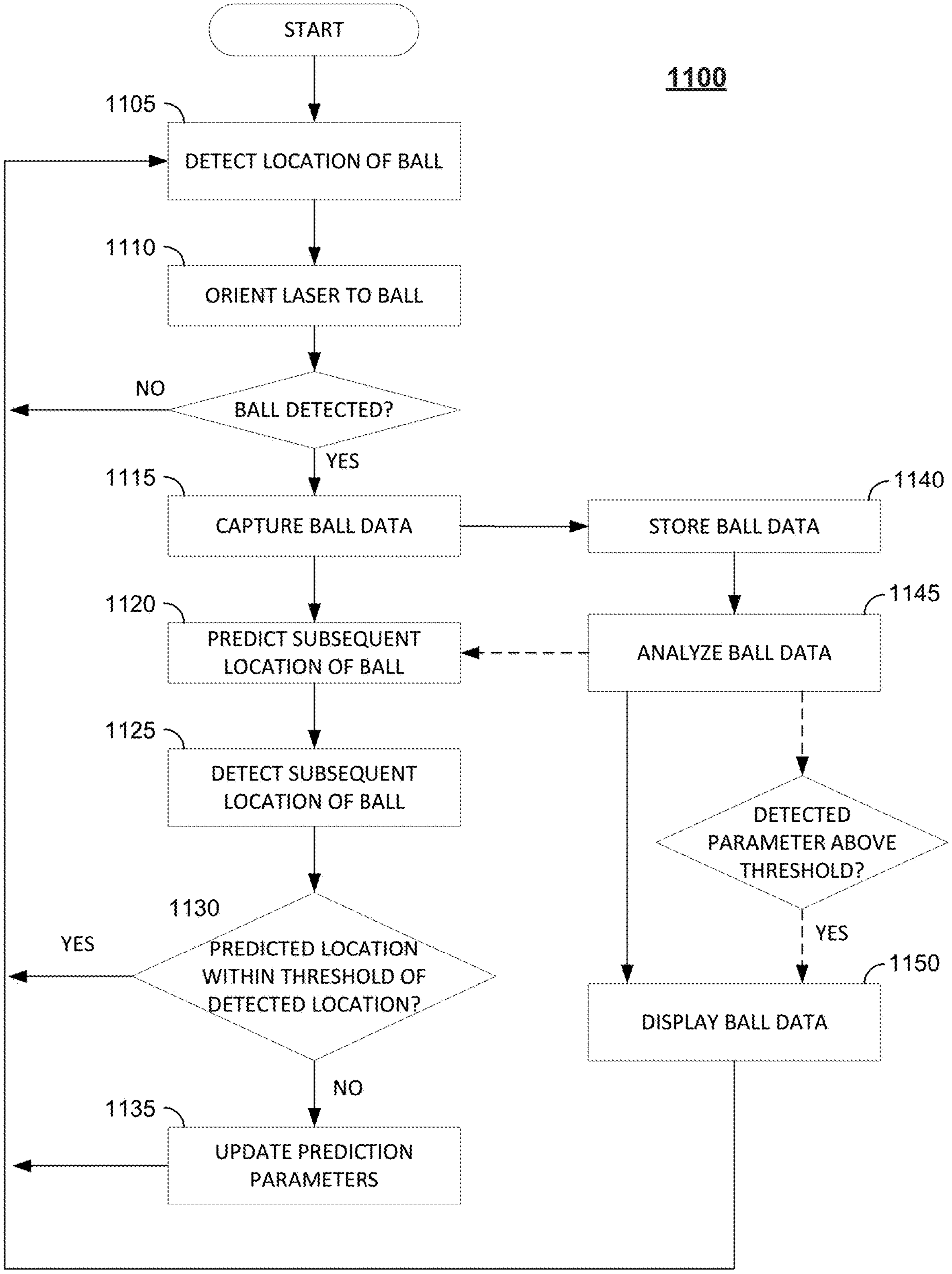
FIG. 11 depicts an illustrative flowchart of a process for detecting, capturing, and visualizing the spinning of objects, in accordance with embodiments of the disclosure.

FIG. 11 depicts an illustrative flow chart of a process 1100 for capturing and visualizing the spinning and location of balls, in accordance with embodiments of the present disclosure.

At step 1105, control circuitry (e.g., control circuitry 562 discussed with respect to FIG. 5) detects the location of a ball. In some embodiments, system 1100 uses one or more cameras to capture video of the ball. System 1100 may then apply an algorithm to detect and track the location of the ball within the video captured by the camera. As the discussed herein, algorithms such as a Kalman filter or particle filter may be used to sample the position and trajectory of the fall to determine its location. In other embodiments, the location of the ball is detected in other ways. For example, the location of the ball is received from sources such as a sensor embedded within the ball.

At step 1110, system 1100 orients the laser to the ball. In an embodiment, system 1100 uses the detected location of the ball (for example, the location detected at step 1105) to orient the laser at the ball, according to the systems and methods discussed herein. For example, system 1100 may use a laser diode to emit a laser beam at a plurality of mirrors. One of the plurality of mirrors is orientable by using one or more motors. In such an embodiment, the laser emitter-detector containing the laser diode, the plurality mirrors, and the plurality of motors may remain stationary while the laser beam is directed at the ball. A non-limiting example of such an embodiment is discussed herein, for example with respect to FIG. 2. In another exemplary embodiment, the laser emitter-detector itself is reoriented so that the laser is directed at the ball. Although the system may be discussed as implementing a single laser beam, any number of laser beams may be used without departing from the contemplated embodiments.

At step 1115 system 1100 captures the balls data. In an embodiment, system 1100 emits a laser at the ball, and receives the returning (scattered) laser beam, containing a speckle pattern. For example, system 1100 may include a photodetector that detects the scattered (or reflected) laser beam after interacting with the surface of a ball. In such an example, the returning laser beam is reflected off one or more mirrors. One of the mirrors may be embodied by a beam splitter, which allows the returning laser beam to follow a similar path as the emitted laser beam, while allowing the returning laser beam to pass through the beam splitter to a photodetector. Exemplary photodetectors, mirrors, and lasers are discussed herein, for example with respect to FIG. 2. Exemplary speckle patterns detected by photodetector are discussed herein, for example speckle pattern 320 (as discussed with respect to FIG. 3); speckle pattern 420*a* and speckle pattern 420*b* (as discussed with respect to FIG. 4).

At step 1120, system 1100 predicts a subsequent location of the ball. In an embodiment, system 1100 uses analysis of ball data (for example the analyzation discussed with respect to step 1145) to determine the ball subsequent location. In such an embodiment, system 1100 determines whether the ball is experiencing rotational movement, translational movement, or both and, based on those characteristics, predicts the ball's location at a subsequent time.

At step 1125, system 1100 the detects a subsequent location of the ball. In an exemplary embodiment, system 1100 may use one or more cameras to capture video of the ball. System 1100 may then apply an algorithm to detect and track the subsequent location of the ball within the video captured by the camera. As discussed herein, algorithms such as a Kalman filter or a particle filter may be used to sample the position and trajectory of the ball in the captured video to determine its subsequent location. In other embodiments, the subsequent location of the ball may be detected in other ways. For example, the location of the ball is received from sources such as a sensor embedded within the ball or other device that determines the ball's location. In other embodiments, system 1100 may use the results of analyzing the ball's data (for example, the analysis discussed with respect to step 1145) to detect a subsequent location of the ball. In other embodiments, system 1100 may use a combination of techniques to determine to detect the subsequent location of the ball, for example, exemplary techniques described herein.

At step 1130, system 1100 determines whether ball's predicted location is within a threshold distance of the detected location. In an embodiment, system 1100 compares a predicted subsequent location of the ball (for example, the analysis discussed with respect to step 1120) to the detected subsequent location of the ball (for example, the analysis discussed with respect to step 1125). System 1100, based on that comparison, determines whether the predicted subsequent location of the ball and the detected subsequent location of the ball are within a tolerance or threshold distance. In some embodiments, system 1100 determines the threshold distance or tolerance based on one or more factors including, the type of sporting event, the conditions of the sporting event, characteristics of the ball, and others. In other embodiments, the threshold distance or tolerance is determined by the user or competitor. In the event that system 1100 determines that the predicted location of the ball is within the threshold of the detective location of the ball, system 1100 proceeds to step 1105 (discussed above). In the event system 1100 determines that the predicted location of the ball is not within the threshold distance of the detected location of the ball, system 1100 proceeds to step 1135 (discussed below).

At step 1135, when it determines that the predicted location of the ball is not within the threshold distance of the detected location of the ball, system 1100 updates the prediction parameters applied herein, for example, those discussed with respect to step 1120. In an embodiment, as discussed with respect to step 1120, system 1100 applies prediction parameters that depend on certain factors including environmental factors and others. By iteratively determining the accuracy of system 1100 prediction by comparing the predicted subsequent location of the ball to the detected location, system 1100 "learns" to refine its prediction parameters over time. In this way, system 1100 increases its accuracy and robustness over time. In some embodiments the system undertakes analysis described in steps 1130 and 1135 each time the ball's characteristics are analyzed. In other embodiments, system 1100 implement steps 1130 and 1135 less than every time. For example, system 1100 may undertake steps 1130 and 1135 once per second. By limiting the number of times system 1100 implements steps 1130 and 1135, system 1100 conserves resources and thus increases response time and minimizes latency.

At step 1140, system 1100 stores the balls data that was captured, for example, at step 1115. The data may be stored either in temporary memory (e.g., RAM) or permanent memory (e.g., hard drive), or in any other storage device suitable for the implementation of the embodiments discussed herein. In some embodiments, the data is communicated over communication network to be stored at a location remote to the laser emitter-detector or the photodetector. For example, the data is communicated over communication network 540 and stored at server 560, for example, at storage device 566 (as discussed with respect to FIG. 5). Additionally, the data may be stored at a location local to the laser emitter-detector and or the photodetector. In such an embodiment, the storage device is connected directly to the photodetector. In a similar embodiment, the data is stored in a storage device housed within the laser emitter-detector.

At step 1145, system 1100 analyzes the ball's data captured, for example, at step 1140. In an embodiment, the returning laser beam detected by the photodetector contains a speckle pattern that is caused by, for example, the interference among wavefronts and coherent lighting so that when the scattered (or reflected) beam arrives at the photodetector, it will be inconsistent in phase. For example, some regions will have light waves building on one another (i.e., in phase), while other regions will have light waves cancelling each other out (i.e., out of phase)—this creates a "noisy" texture. In other words, the speckle pattern contains granular noise texture that is created by the laser beam interacting with imperfections on the surface of a ball. The speckle pattern is discussed herein, for example speckle pattern 320 (discussed with respect to FIG. 3), and speckle pattern 420*a* and speckle pattern 420*b* (discussed with respect to FIG. 4). The speckle pattern received by a photodetector contains many light and dark areas that system 1100 analyzes to determine the movement of the light and dark areas in the speckle pattern over time. System 1100 analyzes the movement of the speckle pattern over time by, for example, identifying certain points (or dots) within the speckle pattern and tracking them over time. This allows system 1100 to determine whether the ball is experiencing rotational movement (i.e., spin), translational movement (i.e., movement in a linear direction), or a combination of the two. Exemplary methods for determining the ball's spin by analyzing the speckle pattern is discussed herein, for example with respect to FIG. 3 and FIG. 4. In embodiments containing multiple laser emitter-detectors, system 1100 may analyze the received speckle patterns individually and combine the results to determine the ball's characteristics. Such an embodiment increases the robustness of system 1100. Additionally, in such an embodiment, system 1100 may compare the results determined from the two or more speckle patterns to determine a confidence level. System 1100 may perform the analysis locally or, in other embodiments, at a computing device remote to the laser emitter and the photodetector. For example, the analysis may be undertaken at server 560 or by control circuitry 562 (as discussed with respect to FIG. 5). In other embodiments, the analysis may be undertaken by control circuitry local to the emitter or the photodetector, for example, by control circuitry contained within the photo emitter and detecting device.

At step 1150, system 1100 displays the balls data. In an embodiment, the ball data is displayed numerically. For example, ball characteristics including ball spin, ball speed, ball trajectory, or any other information relevant to the ball is displayed in a numerical fashion. Such information is discussed herein, for example as displayed on user equipment 650 (discussed with respect to FIG. 6). In other embodiments, system 1100 may display the ball data as a visualization. In such an exemplary embodiment, the visualization is displayed independently or as an overlay on a video feed. In other embodiments, visualizations are displayed by superimposing the visualization over the ball in, for example, a video feed. Exemplary visualizations the system 1000 may display are discussed herein, for example visualization 730*a*, visualization 730*b*, visualization 730*c* (as discussed with respect to FIGS. 7A, 7B, and 7C). Ball data, including numerical representations, visualizations, or both, may be displayed on any display device, without the parting from the contemplated embodiments. For example, ball data is displayed on a television, projector, or other panel display, including those contained in a computer, tablet, cell phone, smart watch, or any other mobile device. Additionally, ball data may be displayed by an augmented reality or virtual reality headset. Exemplary display devices on which ball data may be displayed by system 1100 are discussed herein. For example, displayed device 150 (as discussed with respect to FIG. 1); user equipment 550, user equipment 552, and user equipment 554 (as discussed with respect to FIG. 5); and display device 650 (as discussed with respect to FIG. 6). In some embodiments, one or more of the detected characteristics are continuously displayed. In other embodiments, one or more of the detected characteristics are not displayed. In some embodiments, one or more of the detected characteristics are displayed if a characteristic is above or below a threshold. For example, system 1100 may be configured such that the spin of an object is displayed only when the spin is greater than or equal to, for example, 1000 RPM.

It is contemplated that some suitable steps or suitable descriptions of FIGS. 10-11 may be used with other suitable embodiments of this disclosure. In addition, some suitable steps and descriptions described in relation to FIGS. 10-11 may be implemented in alternative orders or in parallel to further the purposes of this disclosure. For example, some suitable steps may be performed in any order or in parallel or substantially simultaneously to reduce lag or increase the speed of the system or method. Some suitable steps may also be skipped or omitted from the process. Furthermore, it should be noted that some suitable devices or equipment discussed in relation to FIGS. 1-9 could be used to perform one or more of the steps in FIGS. 10-11.

The processes discussed herein are intended to be illustrative and not limiting. For instance, the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

capturing, using a camera, a plurality of images comprising a spherical object;

determining, based on the plurality of images, a location of the spherical object within a reference frame;

orienting, based on the determined location of the spherical object that was determined within the reference frame captured using the camera, an emitted laser beam at the spherical object, the emitted laser beam emanating from a laser emitter; detecting, using a photodetector, a returning laser beam caused by the emitted laser beam interacting with the spherical object, wherein the emitted laser beam and the returning laser beam are coaxial with each other within a predetermined range of the spherical object, and wherein the camera is not coaxial with the oriented emitted laser beam or the returning laser beam;

determining, based solely on the detected returning laser beam, characteristics of the spherical object, wherein the characteristics include (1) a trajectory of the spherical object and (2) a spin of the spherical object associated with a rotational movement of the spherical object, wherein the characteristics are determined by: identifying a speckle pattern within the detected returning laser beam;

identifying a plurality of points within the speckle pattern; and determining movement of the plurality of points over time; and generating for display a visualization related to at least one of the determined characteristics of the spherical object.

2. The method of claim 1, wherein the movement of the plurality of points over time is determined using optical flow analysis.

3. The method of claim 1 further comprising:

orienting, based on the determined location of the spherical object, a second laser beam at the spherical object; and detecting, using a second photodetector, a second returning laser beam, the second returning laser beam caused by the second laser beam interacting with the spherical object.

4. The method of claim 1 further comprising:

determining, using control circuitry, whether a characteristic of the determined characteristics exceeds a threshold;

wherein the visualization is displayed in response to determining that the characteristic of the determined characteristics exceeds the threshold.

5. The method of claim 1, wherein the spherical object is a ball used in a sporting event, and wherein the spherical object moves in a direction other than the direction of the emitted laser beam.

6. The method of claim 1 further comprising:

determining, based on the determined characteristics of the spherical object, a second location of the spherical object; and orienting, based on the determined second location of the spherical object, the emitted laser beam at the second location of the spherical object.

7. The method of claim 1, wherein the visualization comprises a graphical overlay superimposed over a depiction of the spherical object.

8. The method of claim 1, wherein the visualization comprises a graphical overlay superimposed over a video comprising the spherical object.

9. A system comprising: a memory configured to store determined characteristics; and control circuitry operatively coupled to the memory, wherein the control circuitry is configured to: capture, using a camera, a plurality of images comprising a spherical object, the spherical object comprising a rotational movement; determine, based on the plurality of images, a location of the spherical object within a reference frame; orient, based on the determined location of the spherical object, an emitted laser beam at the spherical object, the emitted laser beam emanating from a laser emitter; detect, using a photodetector, a returning laser beam caused by the emitted laser beam interacting with the spherical object, wherein the emitted laser beam and the returning laser beam are coaxial with each other within a predetermined range of the spherical object, and wherein the camera is not coaxial with the oriented emitted laser beam or the returning laser beam; determine, based solely on the detected returning laser beam, characteristics of the spherical object, wherein the characteristics include (1) a trajectory of the spherical object and (2) a spin of the spherical object associated with a rotational movement of the spherical object, wherein the characteristics are determined by: identifying a speckle pattern within the detected returning laser beam; identifying a plurality of points within the speckle pattern; and determining movement of the plurality of points over time; and generate for display a visualization related to at least one of the determined characteristics of the spherical object.

10. The system of claim 9, wherein the movement of the plurality of points over time is determined using optical flow analysis.

11. The system of claim 9, wherein the control circuitry is further configured to:

orient, based on the determined location of the spherical object, a second laser beam at the spherical object; and detect, using a second photodetector, a second returning laser beam, the second returning laser beam caused by the second laser beam interacting with the spherical object.

12. The system of claim 9, wherein the control circuitry is further configured to:

determine whether a characteristic of the determined characteristics exceeds a threshold;

wherein the visualization is displayed in response to determining that the characteristic of the determined characteristics exceeds the threshold.

13. The system of claim 9, wherein the spherical object is a ball used in a sporting event.

14. The system of claim 9, wherein the control circuitry is further configured to:

determine, based on the determined characteristics of the spherical object, a second location of the spherical object; and orient, based on the determined second location of the spherical object, the laser beam at the second location of the spherical object.

15. The system of claim 9, wherein the visualization comprises a graphical overlay superimposed over a depiction of the spherical object.

16. The system of claim 9, wherein the visualization comprises a graphical overlay superimposed over a video comprising the spherical object.

* * * * *